United States Patent
Liu et al.

(10) Patent No.: US 11,205,778 B2
(45) Date of Patent: Dec. 21, 2021

(54) CONDUCTIVE POLYMER EMULSION

(71) Applicants: Gao Liu, Piedmont, CA (US); Tianyue Zheng, Albany, CA (US)

(72) Inventors: Gao Liu, Piedmont, CA (US); Tianyue Zheng, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/900,556

(22) Filed: Jun. 12, 2020

(65) Prior Publication Data

US 2020/0395614 A1   Dec. 17, 2020

Related U.S. Application Data

(60) Provisional application No. 62/860,725, filed on Jun. 12, 2019.

(51) Int. Cl.
| | |
|---|---|
| *H01B 1/20* | (2006.01) |
| *H01M 4/00* | (2006.01) |
| *C08F 220/00* | (2006.01) |
| *H01M 4/62* | (2006.01) |
| *C08F 220/18* | (2006.01) |
| *H01M 10/0525* | (2010.01) |
| *H01M 4/38* | (2006.01) |
| *C08J 3/07* | (2006.01) |

(52) U.S. Cl.
CPC ....... *H01M 4/622* (2013.01); *C08F 220/1804* (2020.02); *C08F 220/1818* (2020.02); *C08J 3/07* (2013.01); *H01B 1/20* (2013.01); *H01M 4/386* (2013.01); *H01M 4/387* (2013.01); *H01M 4/625* (2013.01); *H01M 10/0525* (2013.01)

(58) Field of Classification Search
CPC ... H01B 1/00; H01B 1/20; H01B 1/22; H01B 1/24; C09D 5/24; B05D 5/12; H01M 4/0404; H01M 4/622; C08F 220/10; C08F 220/14; C08F 220/30
See application file for complete search history.

(56) References Cited

U.S. PATENT DOCUMENTS

| | | | |
|---|---|---|---|
| 5,451,650 A | * | 9/1995 | Siol .............. C08F 287/00 526/201 |
| 6,956,083 B2 | | 10/2005 | Kerr et al. |
| 7,101,643 B2 | | 9/2006 | Kerr et al. |
| 7,902,299 B2 | | 3/2011 | Kerr et al. |

(Continued)

OTHER PUBLICATIONS

Yokoe et al "Controlled radical polymerization of anthracene-containing methacrylate copolymers . . . ", Journal of Polymer Science, Part A: Polymer Chemistry 2016, 54, 2302-2311.*

(Continued)

*Primary Examiner* — Mark Kopec
(74) *Attorney, Agent, or Firm* — Robin C. Chiang; Lawrence Berkeley National Laboratory

(57) ABSTRACT

The present invention provides for an emulsion comprising solid particles of a single composition, or a mixture thereof, comprising a polymer comprising one monomer of an aryl methacrylate, or a mixture thereof, co-polymerized with a monomer of an alkyl methacrylate, or a mixture thereof; wherein Ar is an aryl group and R is an alkyl group, and n:m has a ratio of from about 0:100 to about 100:0.

15 Claims, 12 Drawing Sheets

(56) References Cited

U.S. PATENT DOCUMENTS

| | | | |
|---|---|---|---|
| 8,703,009 | B2 | 4/2014 | Liu et al. |
| 8,852,461 | B2 | 10/2014 | Liu et al. |
| 9,077,039 | B2 | 7/2015 | Liu et al. |
| 9,153,353 | B2 * | 10/2015 | Liu ............... H01M 4/134 |
| 9,214,668 | B2 | 12/2015 | Liu et al. |
| 9,444,090 | B2 | 9/2016 | Liu et al. |
| 9,653,734 | B2 | 5/2017 | Liu et al. |
| 9,692,086 | B2 | 6/2017 | Liu et al. |
| 9,705,127 | B2 | 7/2017 | Liu |
| 9,722,252 | B2 | 8/2017 | Liu et al. |
| 9,929,432 | B2 | 3/2018 | Liu et al. |
| 10,038,185 | B2 * | 7/2018 | Jeong ............. H01M 4/366 |
| 10,079,387 | B2 | 9/2018 | Liu et al. |
| 10,170,765 | B2 | 1/2019 | Liu et al. |
| 10,186,705 | B2 | 1/2019 | Liu et al. |
| 10,276,859 | B2 | 4/2019 | Liu |
| 10,340,508 | B2 | 7/2019 | Liu et al. |
| 10,581,118 | B2 | 3/2020 | Liu et al. |
| 10,601,030 | B2 | 3/2020 | Liu et al. |
| 10,833,320 | B2 | 11/2020 | Liu et al. |
| 2015/0044570 | A1 * | 2/2015 | Kim ............... H01M 4/364 429/231.8 |
| 2015/0364755 | A1 | 12/2015 | Liu et al. |
| 2016/0257841 | A1 * | 9/2016 | Tang ............... C09D 187/005 |
| 2018/0076458 | A1 | 3/2018 | Lux et al. |
| 2018/0076459 | A1 | 3/2018 | Lux et al. |

OTHER PUBLICATIONS

Yoshinaga et al Effective dispersion of fullerence with methacrylate copolymer in organic solvent and poly(methyl methacrylate), Colloid Polym Sci (2012) 290:1221-1226.*

Petrov et al "Noncovalent functionalization of multi-walled carbon nanotubes by pyrene containing polymers", Chem. Commun. 2003, 2904-2905.*

Jung et al "A multi-wall carbon nanotube/polymethyl methacrylate composite for use in filed emitters on flexible substrates", Carbon 50 (2012) 987-993.*

Engelis et al "Sequence-controlled methacrylic multiblock copolymers: expanding the scope of sulfur-free RAFT", Macromolecules 2018, 51, 336-342.*

Armand et al., "Building better batteries," Nature 451:652-657 (2008).

Goodenough et al., "Challenges for Rechargeable Li Batteries", Chem. Master. 22:587-603 (2010).

Obrovac et al., "Alloy Negative Electrodes for Li-Ion Batteries", Chem. Rev. 114: 11444-11502 (2014).

Blomgren, "The Development and Future of Lithium Ion Batteries", J. Electrochem. Soc 164: A5019-A5025 (2017).

Ohzuku et al., "Formation of lithium-graphite intercalation compounds in nonaqueous electrolytes and their application as a negative electrode for a Lithium Ion (Shuttlecock) Cell", J. Electrochem. Soc. 140: 2490-2498 (1993).

Graetz et al., "Highly Reversible Lithium Storage in Nanostructured Silicon" Electrochem. Solid-State Lett. 6: A194-A197 (2003).

Christensen et al., "Stress generation and fracture in lithium insertion materials" J. Solid State Electrochem. 10:293-319 (2006).

Li et al., "An In Situ X-Ray Diffraction Study of the Reaction of Li with Crystalline Si" J. Electrochem. Soc. 154: A156-A161 (2007).

Liu et al., "Polymers with Tailored Electronic Structure for High Capacity Lithium Battery Electrodes", Adv. Mater. 23:4679-4683(2011).

Kovalenko et al., "A Major Constituent of Brown Algae for Use in High-Capacity Li-Ion Batteries" Science 334: 75-79 (2011).

Choi et al., "Highly elastic binders integrating Polyrotaxanes for silicon microparticle anodes in lithium ion batteries", Science 357: 279-283 (2017).

Hochgatterer et al., "Silicon/Graphite Composite Electrodes for High-Capacity Anodes: Influence of Binder Chemistry on Cycling Stability", Electrochem. Solid-State Lett. 11: A76-A80 (2008).

Yen et al., "Effects of Styrene-Butadiene Rubber/Carboxymethyl cellulose (SBR/CMC) and Polyvinylidene Difluoride (PVDF) Binders on Low Temperature Lithium Ion Batteries" J. Electrochem. Soc. 160: A1811-A1818 (2013).

Erk et al., "Toward Silicon Anodes for Next-Generation Lithium Ion Batteries: A Comparative Performance Study of Various Polymer Binders and Silicon Nanopowders" Appl. Mater. Interfaces 5: 7299-7307 (2013).

Wei et al., "Poly (acrylic acid dodium) grafted carboxymethyl cellulose as a high performance polymer binder for silicon anode in lithium ion batteries" Sci. Rep. 6: 19583 (2016), 8 pages.

Wu et al., "Toward an Ideal Polymer Binder Design for High-Capacity Battery Anodes" J. Am. Chem. Soc. 135: 12048-12056 (2013).

Park et al., "Side-Chain Conducting and Phase-Separated Polymeric Binders for High-Performance Silicon Anodes in Lithium-Ion Batteries" J. Am. Chem. Soc. 137: 2565-2571 (2015).

Zhao et al., "High Capacity and High Density Functional Conductive Polymer and SiO Anode for High-Energy Lithium-Ion Batteries" ACS Appl. Mater. Interfaces 7: 862-866 (2015).

Zheg et al., "Molecular Spring Enabled High-Performance Anode for Lithium Ion Batteries", Polymers 9: 657 (2017), 10 pages.

Lee et al., "Effect of Carboxymethyl Cellulose on Aqueous Processing of Natural Graphite Negative Electrodes and their Electrochemical Performance for Lithium Batteries" J. Electrochem. Soc. 152: A1763-A1769 (2005).

Li et al., "Sodium Carboxymethyl Cellulose A Potential Binder for Si Negative Electrodes for Li-Ion Batteries" Electrochem. Solid-State. Lett. 10: A17-20 (2007).

Nagasubramanian et al., "Improving the interfacial resistance in lithium cells with additives" J. Power Sources 96: 29-32 (2001).

Holzapfel et al., "A new type of nano-sized silicon/carbon composite electrode for reversible lithium insertion", Chem. Commun. 12: 1566-1568 (2005).

Zheng et al., "Aqueous emulsion of conductive polymer binders for Si anode materials in lithium ion batteries", European Polymer Journal 114: 265-270 (2019).

* cited by examiner

Solid ratio = 22.7%
Partical size: 478 ± 80 nm; PDI = 0.19

Polymer compositions: 0% Anthracenemethacrylate and 100% butylmethacrylate
Particle size: 92 ± 67 nm; PDI = 0.52

Polymer composition: 10% Anthracenemethacrylate and 90% butylmethacrylate
Particle size: 84 ± 30 nm; PDI = 0.14

30% Anth
110 ± 48 nm
PDI = 0.19

Specific capacity

Coulombic efficiency

Specific capacity

Coulombic efficiency

CONDUCTIVE POLYMER EMULSION

CROSS REFERENCE TO RELATED APPLICATIONS

The application claims priority to U.S. Provisional Patent Application Ser. No. 62/860,725, filed Jun. 12, 2019; which is incorporated herein by reference.

STATEMENT OF GOVERNMENTAL SUPPORT

The invention was made with government support under Contract No. DE-AC02-05CH11231 awarded by the U.S. Department of Energy. The government has certain rights in the invention.

FIELD OF THE INVENTION

This invention relates generally to lithium rechargeable batteries, and more specifically to a conductive polymer emulsion as an electrode binder adhesive material for lithium rechargeable batteries.

BACKGROUND OF THE INVENTION

Lithium ion batteries (LIBs) have been developed into an important technology for energy storage applications, while the demand for materials with high energy density is urgent [1], [2], [3], [4]. The battery electrodes normally include three components: active materials, conductive additives and polymer binders. While the active materials are the major contribution for lithium storage and the conductive additive can provide better conductivity inside the electrodes, the polymer binders, though small amount, adhesively connecting all the electrode materials for long-term charge/discharge cycling. For the anode, silicon materials show very promising future since it is earth abundant and has about ten times higher theoretical capacity than that of graphite, which is the state-of-the-art anode material in many commercial LIBs [5], [6]. However, one problem of silicon that has hindered its wide application is its huge volume change during the lithiation/delithiation cycles, which may lead to many surface side reactions and battery failure [7], [8]. New challenges have arisen to make the practical application of silicon materials, including better electronic and ionic, chemical and mechanical properties of the materials. To address this issue, one approach is to develop new polymer binders to accommodate the volume change of silicon materials [9], [10], [11]. Conventionally, polymers such as poly(vinylidene difluoride) (PVDF), carboxymethyl cellulose (CMC), styrene-butadiene rubber (SBR), poly(acrylic acid) (PAA), have been widely used as the binders due to their benign electrochemical stability and binding ability in the electrode matrix [12], [13], [14], [15]. In addition, these polymers are able to be prepared into either solution or emulsion in water that can be used for aqueous process of battery electrode fabrication, which avoids the use of toxic organic solvents to make the electrode fabrication process lower in cost and less hazardous to the human health and environment.

As one special category of polymer binders, conductive polymer binders have shown promising properties for silicon materials in LIBs. The advantages include better electronic connection for active materials in the electrode matrix, reduced usage of conductive additives [9], [16]. Recently, a series of methacrylate polymer containing pyrene moiety in the side chains has been developed into polymer binders for silicon containing anode materials [17], [18], [19]. They show strong adhesion towards silicon materials, semiconducting properties, and tunable mechanical properties to better accommodate the volume change of silicon materials to achieve long term cycling with high capacity and energy density. However, these conductive polymers are barely soluble in water and organic solvent is normally required for electrode coating process. It could be potentially beneficial to explore water-based conductive polymer binders, so as to take advantages of the aqueous electrode coating process.

SUMMARY OF INVENTION

The present invention provides for an emulsion comprising solid particles of a single composition, or a mixture thereof, comprising a polymer comprising one monomer of

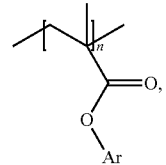

or a mixture thereof, co-polymerized with a monomer of

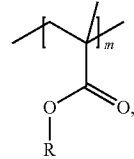

or a mixture thereof; wherein Ar is an aryl group and R is an alkyl group, and n:m has a ratio of from about 0:100 to about 100:0.

In some embodiments, the emulsion is aqueous (water based).

In some embodiments, the Ar is a phenyl or any polycyclic aryl group. In some embodiments, the Ar is a phenyl or any polycyclic aryl group with two, three or four aryl rings. In some embodiments, the Ar is

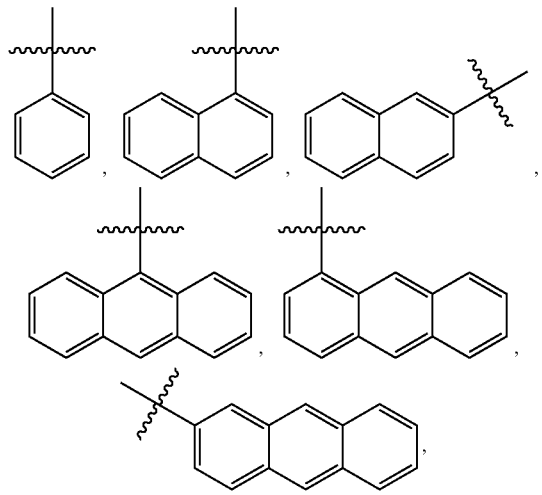

-continued

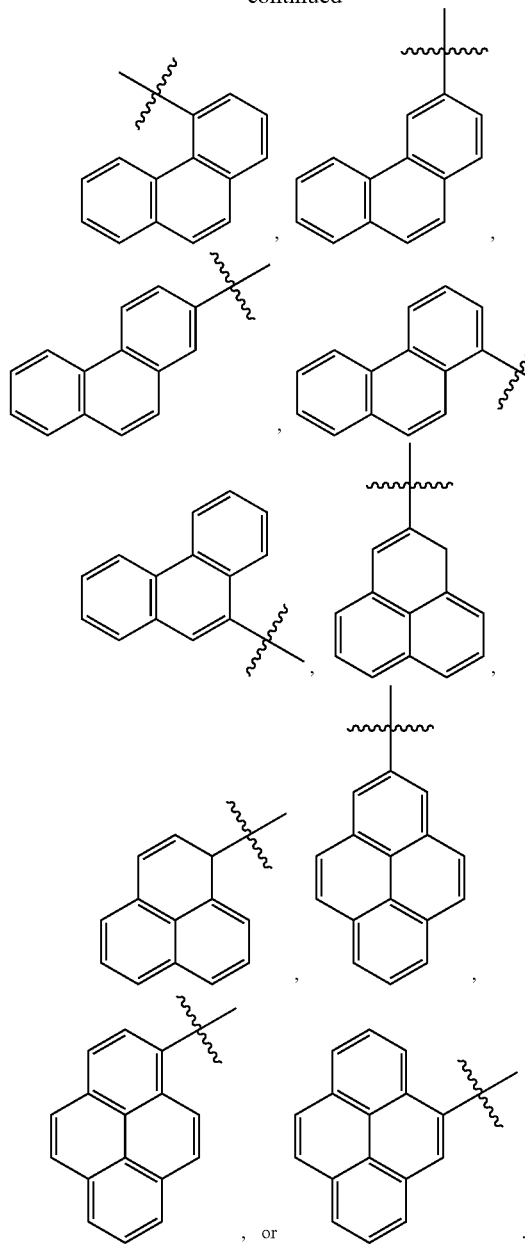

In some embodiments, the R is any $C_1$-$C_{10}$ alkyl group. In some embodiments, the R is any $C_1$-$C_5$ alkyl group. In some embodiments, the R is a methyl, ethyl, propyl, isopropyl, butyl, s-butyl, isobutyl, or t-butyl group.

In some embodiments, the solid particles have an average particle size of about 10 nm to about 500 nm. In some embodiments, the solid particles have an average particle size of about 50 nm to about 200 nm. In some embodiments, the solid particles have an average particle size of about 80 nm to about 500 nm. In some embodiments, the solid particles have a distribution of particle size of about 374±96 nm (PDI=0.064). In some embodiments, the solid particles have a distribution of particle size of about 478±80 nm (PDI=0.19). In some embodiments, the solid particles have a distribution of particle size of about 92±67 nm (PDI=0.52). In some embodiments, the solid particles have a distribution of particle size of about 84±30 nm (PDI=0.14). In some embodiments, the solid particles have a distribution of particle size of about 110±48 nm (PDI=0.19).

In some embodiments, the polymer comprises at least one monomer of

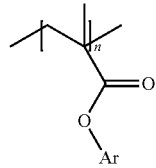

co-polymerized with at least one monomer of

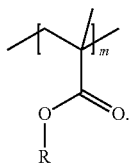

In some embodiments, the n:m has a ratio of from about 0:100 to about 1:1. In some embodiments, the n:m has a ratio of about 0:100, about 5:95, about 1:9, about 2:8, about 3:7, about 4:6, and about 5:5, or a range of ratios between any two preceding ratios. In some embodiments, the solid particles form at least about 10 weight percent. In some embodiments, the solid particles form at least about 20 weight percent. In some embodiments, the solid particles form at least about 30 weight percent. In some embodiments, the solid particles form at least about 40 weight percent. In some embodiments, the solid particles form at least about 50 weight percent.

The present invention also provides for a method for making an electrode for use in a lithium ion battery comprising the steps of: a) forming the emulsion of the present invention; b) to this solution adding micro or nanoparticles of at least one element selected from the group consisting of: silicon, Sn, and graphite to form a slurry; c) mixing the slurry to form a homogenous mixture; d) depositing a thin film of said thus obtained mixture over top of a substrate; and e) drying the resulting composite to form said silicon electrode.

The present invention also provides for a lithium ion battery having a silicon electrode incorporating solid particles of a single composition, or a mixture thereof, of the present invention.

In some embodiments, the water based conductive polymer emulsion is developed based on methacrylate emulsion polymerization in water-based medium. The polymers are either benzylmethacrylate, naphthalenemethacryalte, anthracenemethacrylate, pyrenemethacrylate and copolymerized with other monomers. In some embodiments, the particle size of the emulsion solid is in about 50-200 nm scale. In some embodiments, the solid content are larger than about 20% in the emulsion. The mechanical properties of the emulsion particles can vary according to the copolymers. These emulsions are suitable for use as an electrode binder adhesive material for lithium rechargeable batteries, such as with Si anode materials. The electrode performance is superior than use other polymer binders.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
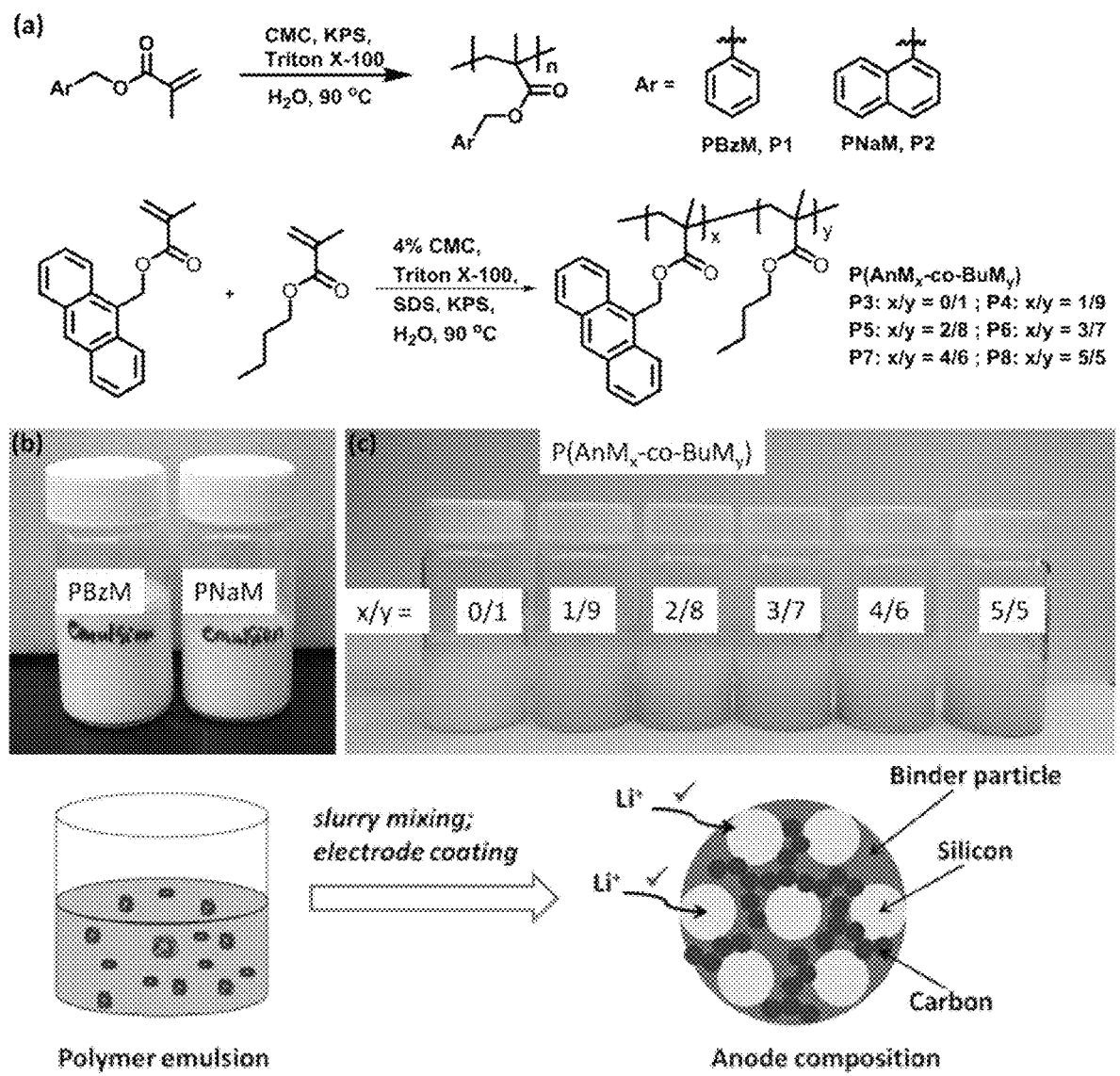
FIG. 1. PBzM, PNaM and P(AnM$_x$-co-BuM$_y$) polymer emulsions. (a) Synthetic scheme, (b, c) physical appearance of PBzM, PNaM and P(AnM$_x$-co-BuM$_y$) polymer emulsions. Use of the emulsion in fabricating an anode electrode.

Before the invention is described in detail, it is to be understood that, unless otherwise indicated, this invention is not limited to particular sequences, expression vectors, enzymes, host microorganisms, or processes, as such may vary. It is also to be understood that the terminology used herein is for purposes of describing particular embodiments only and is not intended to be limiting.

In this specification and in the claims that follow, reference will be made to a number of terms that shall be defined to have the following meanings:

The terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

As used in the specification and the appended claims, the singular forms "a," "an," and "the" include plural referents unless the context clearly dictates otherwise. Thus, for example, reference to "polymers" includes a plurality of a polymer compound species as well as a plurality of polymer compounds of different species.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

The term "about" refers to a value including 10% more than the stated value and 10% less than the stated value.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

In some embodiments, the conductive polymer emulsion comprises side-chain conducting polymers. In some embodiments, the polymer is dispersed in an aqueous solution into nanosize suspension particles. In some embodiments, the particles are both adhesive and conductive. In some embodiments, the emulsion is suitable for use as a polymer binder for lithium ion batteries. In some embodiments, the emulsion binders are particularly suitable for Si based electrode, where large volume changes are expected during charge and discharge.

In some embodiments, the emulsion is used as a polymer binder/adhesive for lithium-ion battery electrode fabrication. In a lithium-ion battery, both the cathode and anode electrode are made of active materials and conductive agents (such as carbon black) and a polymer binder. The binders of the present invention are electrically conductive and flexible, so it can replace both polymer binder and conductive agents as a flexible conductive adhesive.

A generic synthesis scheme for the water-based conductive binders for lithium ion batteries is as follows:

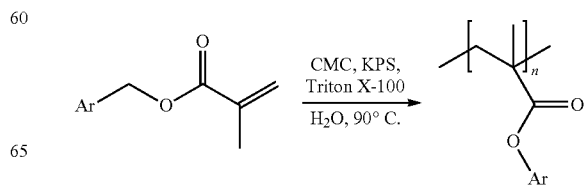

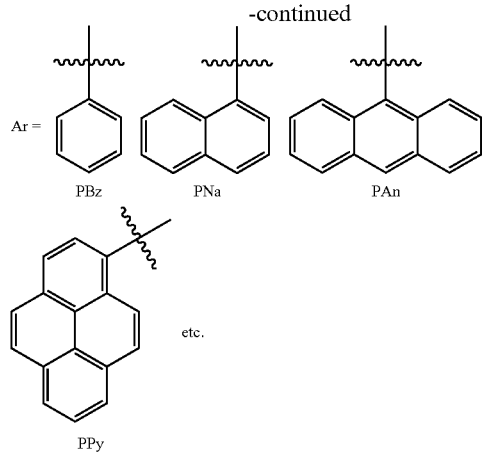

The emulsions of the present invention are useful as binders for lithium ion batteries. The emulsion of the present invention have one or more of the following advantages:
1. These polymer binders are water dispersions so comparable with current battery manufacturing process.
2. The latex binder are electrically conductive to improve electronic conductivity.
3. The binder are also flexible to improve particle to particle interactions to better accommodate volume change of the electrode.

In a particular embodiment, the method comprises:
1. To a round bottom flask, add 0.5 g monomer, 1.6 g 4% CMC solution, 0.15 g Triton X-100 and 3.6 g H$_2$O. In some embodiments, the ingredients for the reaction are shown in Table 1 or Table 2.
2. The mixture is stirred magnetically at 1000 rpm for 15 min until it forms a stable milky emulsion.
3. Under nitrogen atmosphere, heat to 70° C. (the mixture becomes transparent), add 1 mL K$_2$S$_2$O$_8$ solution, keep stirring for 30 min.
4. Add the rest monomer and K$_2$S$_2$O$_8$ solution in 30 min.
5. Set stirring rate to 600 rpm, heat to 80° C. for 1 hour, then 85° C. for 30 min (still transparent).
6. Heat to 90° C., the mixture gradually turns into milky emulsion again. Keep for 1 hour, stop the reaction.
7. Solid content (SC) is measured to be 23.8%.
8. Particle size distribution is measured by dynamic light scattering (DLS). d-350 nm, PDI=0.039.
9. SEM images of the PBz emulsion particles.

TABLE 1

| # | material | amount |
|---|----------|--------|
| 1 | Benzyl methacrylate | 3.2 g |
| 2 | 4% CMC in water solution | 1.6 g |
| 3 | Triton X-100 | 0.15 g |
| 4 | potassium persulfate (K$_2$S$_2$O$_8$) | 11 mg in 4 mL water (0.2% eq.) |

TABLE 2

| 1 | Naphthalene methacrylate | 2.8 g |
|---|----------|--------|
| 2 | 4% CMC in water solution | 1.3 g |
| 3 | Triton X-100 | 0.12 g |
| 4 | potassium persulfate (K$_2$S$_2$O$_8$) | 9.8 mg 4 mL water (0.3% eq.) |

A reaction scheme for the anc-bu copolymer is as follows:

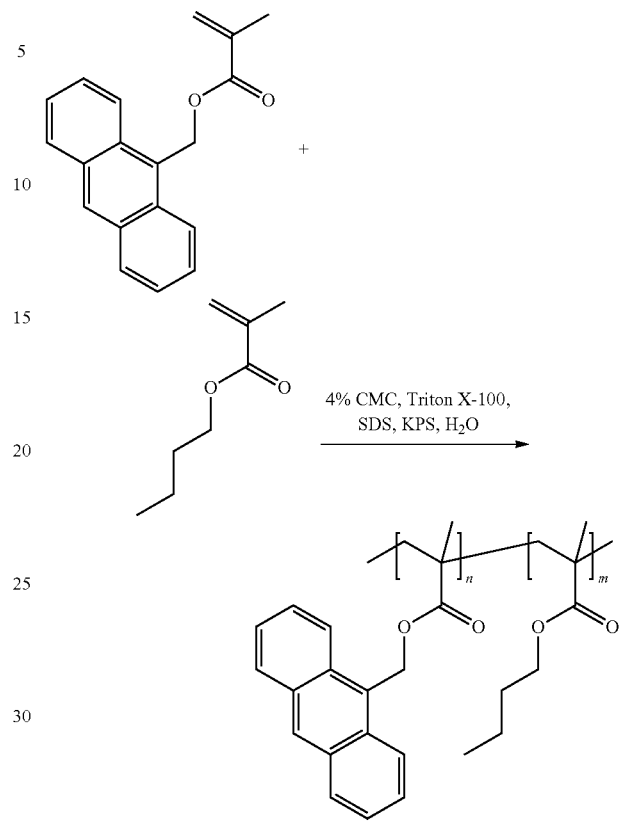

Further exemplary ingredients for the reaction to synthesize exemplary co-polymer is shown in Table 3.

TABLE 3

| | AM/BM = 5/5 | |
|---|---|---|
| # | material | amount |
| 1 | anthracene methacrylate (AM) | 0.542 g |
| 2 | butyl methacrylate (BM) | 0.281 g |
| 3 | sodium dodecyl sulfate(SDS) | 32.3 mg |
| 4 | 4% CMC in water solution | 1.5 g |
| 5 | Triton X-100 | 0.15 g |
| 6 | potassium persulfate (K$_2$S$_2$O$_8$) | 8.7 mg in 2.5 mL water (0.8% eq.) |

In a particular embodiment, the method comprises:
1. Anthracene methacrylate is dissolved in butyl methacrylate (solution A).
2. To solution A, add solution B: 32.3 mg SDS, 1.5 g 4% CMC, 0.17 g Triton X-100 in 2.5 g H$_2$O.
3. The mixture is stirred magnetically at 1000 rpm for 15 min, sonicated for 15 min, and again stirred magnetically at 1000 rpm for 15 min. A light yellow milky suspension is formed.
4. Under nitrogen atmosphere, heat to 70° C., add 1 mL K$_2$S$_2$O$_8$ solution, keep stirring for 30 min.
5. Add the rest monomer and K$_2$S$_2$O$_8$ solution in 15 min.
6. Set stirring rate to 700 rpm, heat to 80° C. for 30 min, then 90° C. for 3 hours.

Further exemplary ingredients for the reaction to synthesize exemplary co-polymer are shown in Tables 4-9.

TABLE 4

AM/BM = 4/6

| # | material | amount |
|---|---|---|
| 1 | anthracene methacrylate (AM) | 0.604 g |
| 2 | butyl methacrylate (BM) | 0.473 g |
| 3 | sodium dodecyl sulfate(SDS) | 32.4 mg |
| 4 | 4% CMC in water solution | 1.5 g |
| 5 | Triton X-100 | 0.15 g |
| 6 | potassium persulfate ($K_2S_2O_8$) | 12.7 mg in 2.5 mL water (0.8% eq.) |

TABLE 5

AM/BM = 3/7

| # | material | amount |
|---|---|---|
| 1 | anthracene methacrylate (AM) | 0.515 g |
| 2 | butyl methacrylate (BM) | 0.6 g |
| 3 | sodium dodecyl sulfate(SDS) | 33.3 mg |
| 4 | 4% CMC in water solution | 1.5 g |
| 5 | Triton X-100 | 0.15 g |
| 6 | potassium persulfate ($K_2S_2O_8$) | 13.7 mg in 2.5 mL water (0.8% eq.) |

TABLE 6

AM/BM = 2/8

| # | material | amount |
|---|---|---|
| 1 | anthracene methacrylate (AM) | 0.503 g |
| 2 | butyl methacrylate (BM) | 1.04 g |
| 3 | sodium dodecyl sulfate(SDS) | 32.8 mg |
| 4 | 4% CMC in water solution | 1.5 g |
| 5 | Triton X-100 | 0.15 g |
| 6 | potassium persulfate ($K_2S_2O_8$) | 15 mg in 2.5 mL water (0.6% eq.) |

TABLE 7

AM/BM = 1/9

| # | material | amount |
|---|---|---|
| 1 | anthracene methacrylate (AM) | 0.275 g |
| 2 | butyl methatrylate (BM) | 1.27 g |
| 3 | sodium dodecyl sulfate(SDS) | 34.7 mg |
| 4 | 4% CMC in water solution | 1.5 g |
| 5 | Triton X-100 | 0.15 g |
| 6 | potassium persulfate ($K_2S_2O_8$) | 16 mg in 2.5 mL water (0.6% eq.) |

TABLE 8

AM/BM = 5/95

| # | material | amount |
|---|---|---|
| 1 | anthracene methacrylate (AM) | 0.12 g |
| 2 | butyl methatrylate (BM) | 1.17 g |
| 3 | sodium dodecyl sulfate(SDS) | 30 mg |
| 4 | 4% CMC in water solution | 1.5 g |
| 5 | Triton X-100 | 0.15 g |
| 6 | potassium persulfate ($K_2S_2O_8$) | 13.2 mg in 2.5 mL water (0.6% eq.) |

TABLE 9

AM/BM = 0/1

| # | material | amount |
|---|---|---|
| 1 | anthracene methacrylate (AM) | 0 g |
| 2 | butyl methacrylate (BM) | 1.47 g |
| 3 | sodium dodecyl sulfate(SDS) | 30 mg |
| 4 | 4% CMC in water solution | 1.5 g |
| 5 | Triton X-100 | 0.15 g |
| 6 | potassium persulfate ($K_2S_2O_8$) | 15.4 mg in 2.5 mL water (0.6% eq.) |

Figure 13:
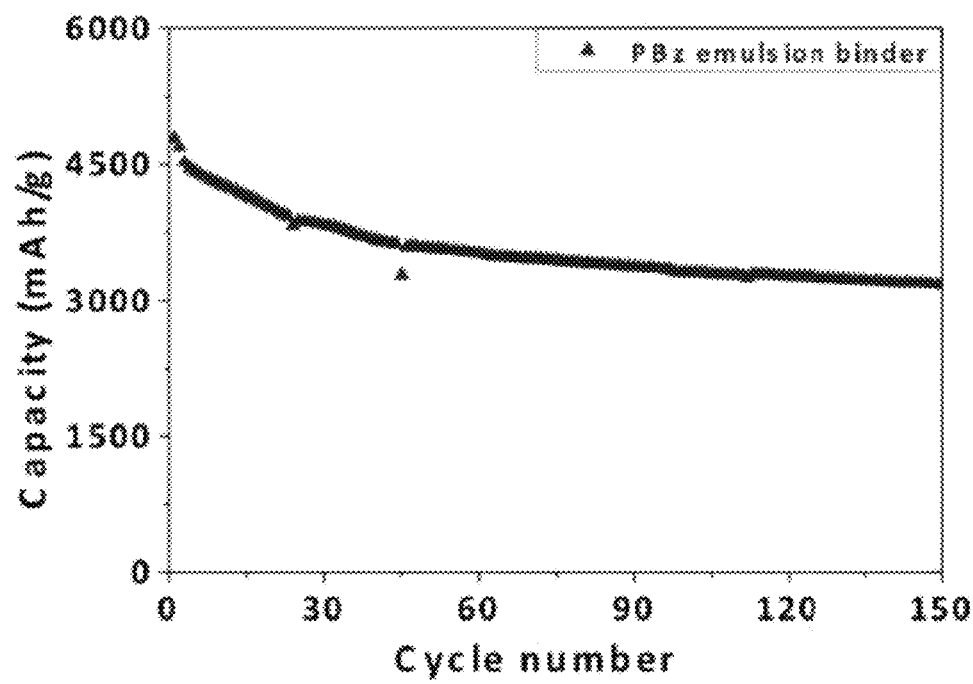
FIG. 13. Cycling performance of PBzM binder. The composition is nano Si (50-70 nm)/PBzM/Acetylene Black=8/1/1 by weight.
Figure 13:
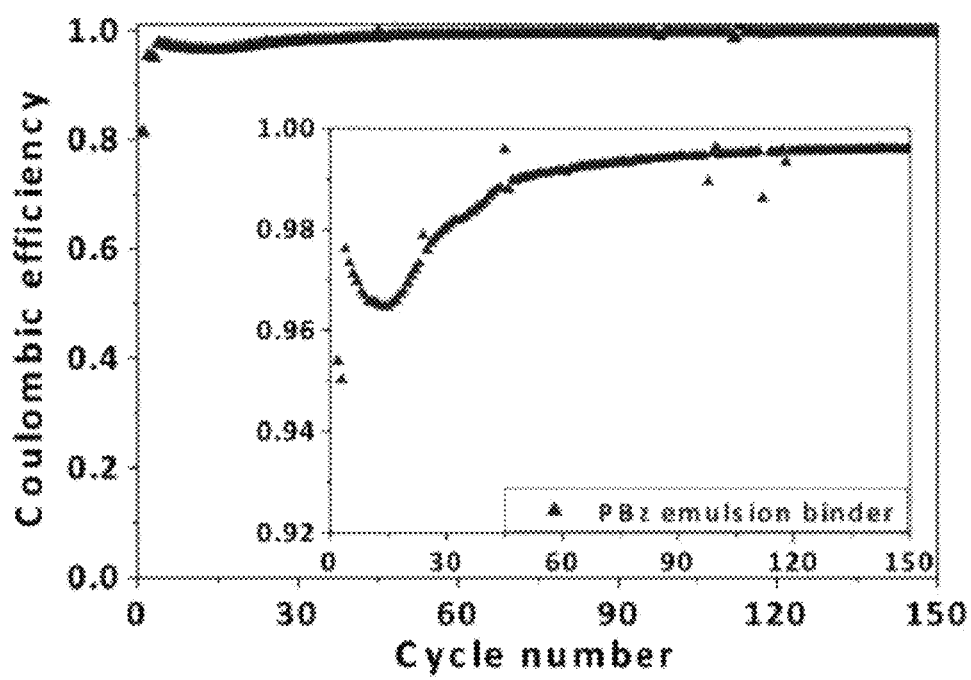
Figure 14:
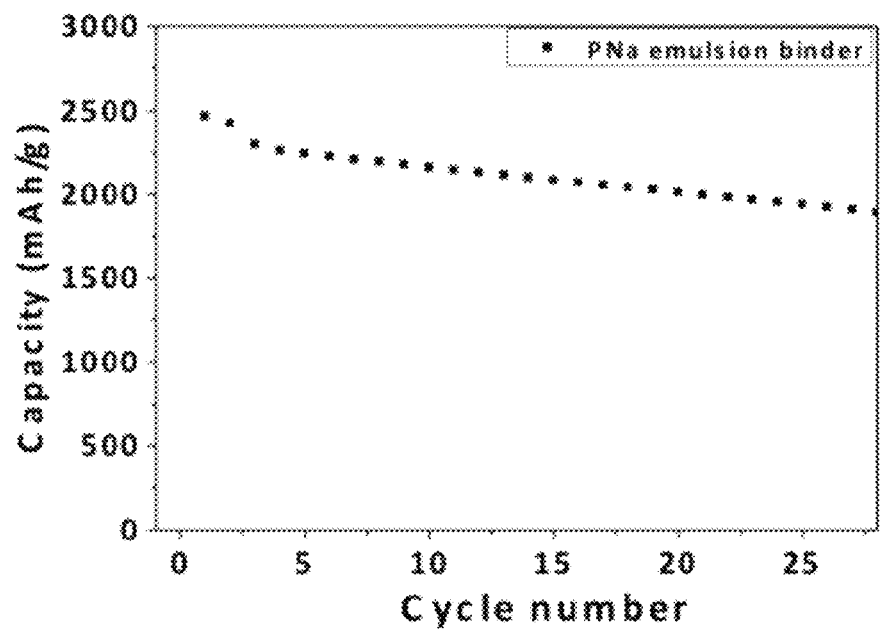
FIG. 14. Cycling performance of PNaM binder. The composition is nano Si (50-70 nm)/PNaM=2/1 by weight.
Figure 14:
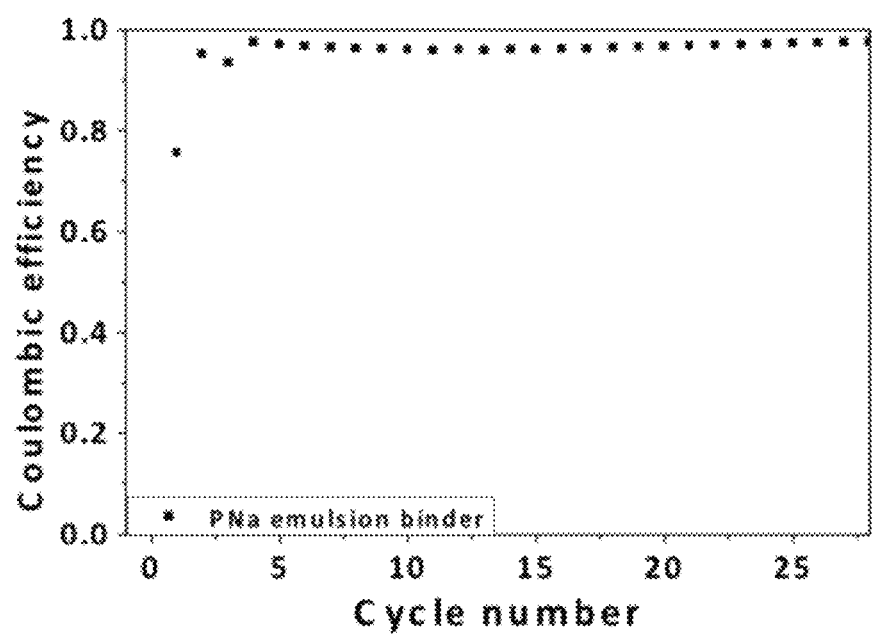
Figure 15:
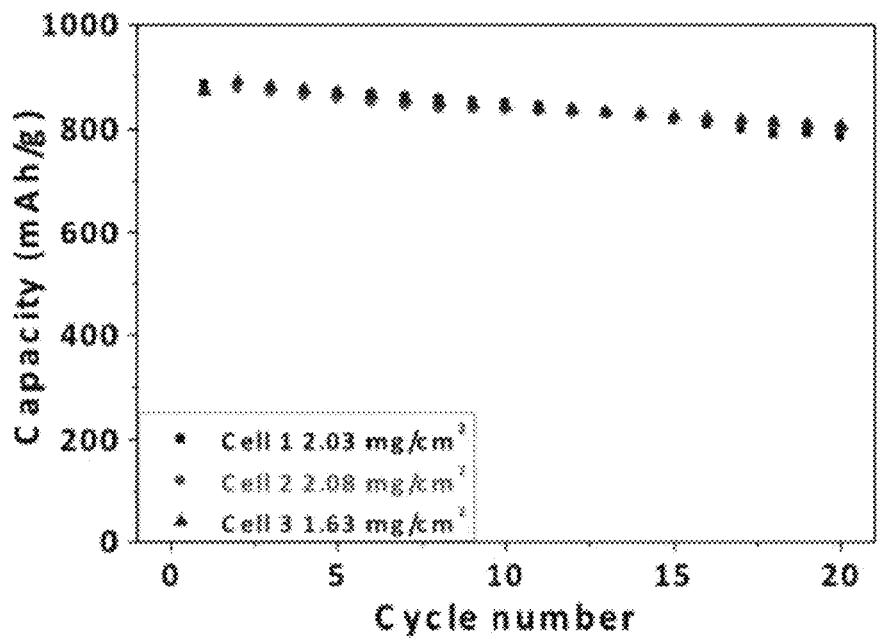
FIG. 15. Cycling performance of PNaM binder. The compositions are Mag-E graphite/nano Si (50-70 nm)/C45/CMC/PNaM=73/15/2/2/8 by weight.
Figure 15:
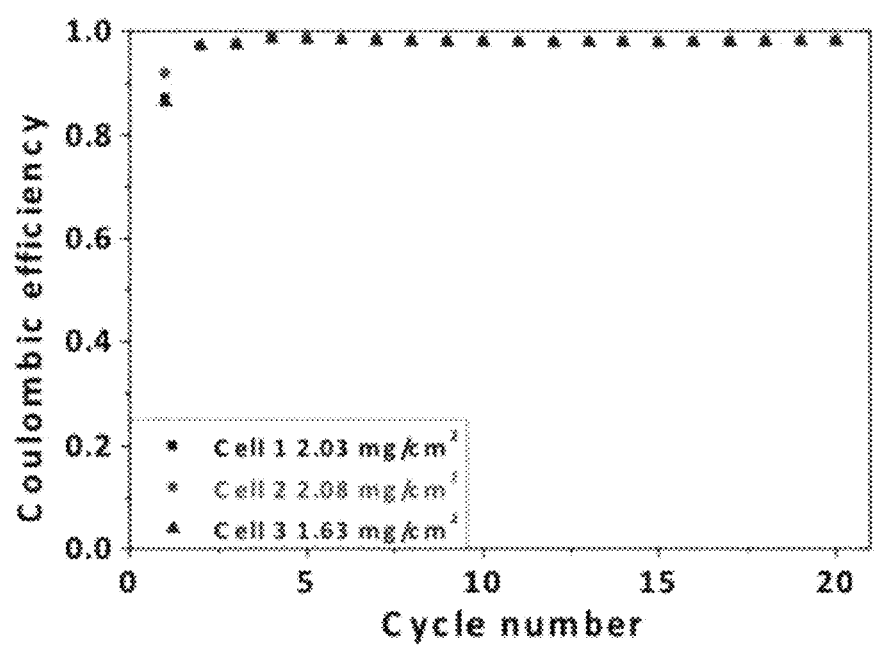

The distribution of particle sizes for exemplary emulsions is shown in FIGS. 9-12. Cycling performance of various binder are shown in FIGS. 13-15.

1. Scanning Electron Microscopy (SEM). SEM images are collected with a JEOL JSM-7500F field emission scanning electron microscopy with an accelerating voltage of 15 kV at room temperature.

2. Dynamic Light Scattering (DLS). For the particle size distribution measurement of a polymer binder emulsion, one drop of each freshly synthesized emulsion is added to 2 mL water and then sonicated for 2 minutes. After that, DLS measurement for particle size distribution is conducted at a Particulate Systems NanoPlus Zeta/nano particle analyzer.

3. Electrode fabrication.

Exemplary Electrode Fabrication 1:
(1) Materials: nano Si (50-70 nm, Nanostructured & amorphous materials, inc); Acetylene black (AB), PBz emulsion, water.
(2) Anode Composition: nano Si/AB/PBz=8/1/1 by weight.
(3) Slurry Preparation: to the mixture of 0.112 g nano Si and 0.014 g AB, 0.06 g PBz emulsion is added, followed by adding 2.3 g water. The mixture is well mixed by a homogenizer set at 2500 rpm for 45 minutes.
(4) Cast and Dry Electrode:
  (a) Clean the copper foil before casting slurry.
  (b) Set the doctor blade at a height of 100 μm. Before casting, perform one final mixing of the slurry using the homogenizer set at 1000 rpm for 1 minute to eliminate any bubbles. Slurry is then poured adjacent to the doctor blade holder and allowed it to spread across the blade.
  (c) Cast the slurry at a constant speed of 100 cm/min. After the casting has stopped, let the laminate to dry for 30 minutes at room temperature. Turn the heat of the coater into 50° C. drying for another 2 hours.
  (d) Once the laminate is dry, turn off the heat to let it cool down to room temperature. Then punch the electrode to 9/16 inch in diameter. The electrodes are further dried at 120° C. for 12 hours under high vacuum.

Exemplary Electrode Fabrication 2
(1) Materials: nano Si (50-70 nm, Nanostructured & amorphous materials, inc); PNa emulsion, water.
(2) Anode Composition: nano Si/PNa=2/1 by weight.
(3) Slurry Preparation: to 0.15 g nano Si, 0.34 g PNa emulsion is added, followed by adding 2 g water. The mixture is well mixed by a homogenizer set at 2500 rpm for 1 hour.
(4) Cast and Dry Electrode: same as in Example 1.

Exemplary Electrode Fabrication 3
(1) Materials: nano Si (50-70 nm, Nanostructured & amorphous materials, inc); magE graphite; C45 (Timcal); CMC (4% wt in water); PNa emulsion, water.
(2) Anode Composition: nano Si/magE/C45/CMC/PNa=15/73/2/2/8 by weight.

(3) Slurry Preparation: a mixture of 0.0461 g of nano Si, 0.224 g magE and 0.006 g C45 is manually milled for 40 minutes to form a fine powder; then 0.154 g CMC solution is added and manually milled for another 15 minutes; then 0.108 g PNa emulsion is added and manually milled for another 15 minutes; then 1.39 g water is added and manually milled for another 15 minutes.

(4) Cast and Dry Electrode: same as in e.g. 1 except that the doctor blade is set to a height of 150 μm.

4. Cycling procedure

C/3 with CV in each step (for e.g. 1 and 2, 1C=4.4 A/g; for e.g. 3, 1C=1 A/g): 1st Cycle: Open circuit potential to 10 mV Galvanostatic with C/20, then potentiostatic at 10 mV till a cut-off of C/50; 10 mV to 1000 mV Galvanostatic with C/20; 2nd Cycle: 1000 mV to 10 mV Galvanostatic with C/10, then potentiostatic at 10 mV till a cut-off of C/20; 10 mV to 1000 mV Galvanostatic with C/10; 3rd Cycle and following cycles: 1000 mV to 10 mV Galvanostatic with C/3, then potentiostatic at 10 mV till a cut-off of C/50; 10 mV to 1000 mV Galvanostatic with C/3.

According to this invention the conductive polymers in the emulsion can act as a binder for the silicon particles used for the construction of an electrode, such as the negative anode. The emulsion can coat on a substrate such as copper or aluminum and thereafter allowed to dry to form the film electrode. Though the silicon particles can range from micron to nano size, the use of nano sized particles is preferred as such results in an electrode material that can better accommodate volume changes.

The conductive polymers in the emulsion can be mixed with the silicon particles, and coated onto a substrate such as copper and allowed to dry to form the electrode material.

Chemicals

All the starting chemical materials for synthesis of the conductive polymer can be purchased from Sigma-Aldrich. Battery-grade AB with an average particle size of 40 nm, a specific surface area of 60.4 m$^2$/g, and a material density of 1.95 g/cm$^3$ can be acquired from Denka Singapore Private Ltd. PVDF KF1100 binder with a material density of 1.78 g/cm$^3$ can be supplied by Kureha, Japan. Anhydrous N-methylpyrrolidone NMP with 50 ppm of water content can be purchased from Aldrich Chemical Co.

As described above, the conductive polymers of this invention can be used as electrically conductive binders for Si nanoparticles electrodes. The electron withdrawing units lowering the LUMO level of the conductive polymer make it prone to reduction around 1 V against a lithium reference, and the carboxylic acid groups provide covalent bonding with OH groups on the Si surface by forming ester bonds. The alkyls in the main chain provide flexibility for the binder.

General Electrode Compositions

The electrode is a composite of at least one active material particle and conductive polymer binder.

The active material particles can be Si micron or nano particles, or can be Sn micron or nano particles; or can be any alloy that contain Si, Sn, or graphite and other elements.

The active material particles can also be graphite particles mixed with the above mentioned Si and Sn materials in different compositions.

Typical Synthetic Procedures for Certain Monomers

Synthesis of 9-anthrylmethyl methacrylate. 9-Anthracenemethanol (30 g) is dissolved in freshly distilled THF (150 mL). To the solution triethylamine (30 mL) and pyridine (20 mL) were added and the mixture was cooled down to 0° C. Then methacryloyl chloride (21 mL) is added dropwise. After the addition, ice-water bath is removed and the mixture is stirred for 1 hour. After water (75 mL) is added to the reaction flask, the solution is transferred into separatory funnel and extracted with diethyl ether (500 mL). The extract is washed with aqueous HCl (1 M, 150 mL), aqueous NaHCO$_3$(5%, 150 mL), and brine (150 mL), respectively. The solvent is evaporated in vacuum and recrystallized with methanol. (Product: 21 g)$^1$H NMR (500 MHz, CDCl$_3$): δ 8.55 (s, 1H), 8.41 (d, J=8.9 Hz, 2H), 8.07 (d, J=8.4 Hz, 2H), 7.61 (t, J=7.7 Hz, 2H), 7.53 (t, J=7.9 Hz, 2H), 6.25 (s, 2H), 6.08 (s, 1H), 5.54 (s, 1H), 1.95 (s, 3H) ppm.

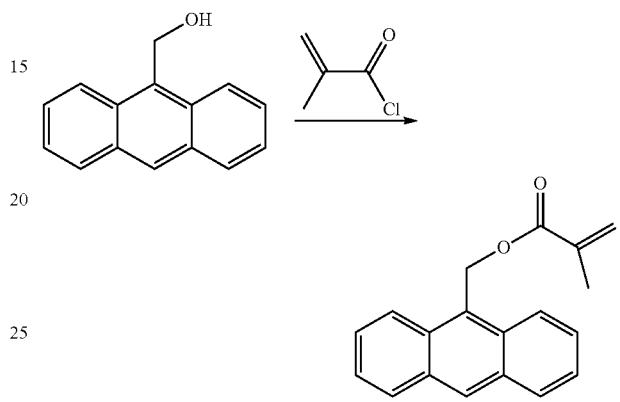

Synthesis of 1-pyrenemethyl methacrylate. The same procedure as that of 9-anthrylmethyl methacrylate is executed. 1-pyrenemethanol (30 g), freshly distilled THF (280 mL), triethylamine (28 mL), pyridine (18 mL), methacryloyl chloride (19 mL) is used. (Product: 43 g)$^1$H NMR (500 MHz, CDCl$_3$): δ 8.35 (d, J=9.2 Hz, 1H), 8.25 (t, J=6.6 Hz, 2H), 8.21 (d, J=9.8 Hz, 2H), 8.12 (t, J=4.6 Hz, 3H), 8.06 (m, 1H), 6.18 (s, 1H), 5.95 (s, 2H), 5.59 (s, 1H), 2.00 (s, 3H) ppm.

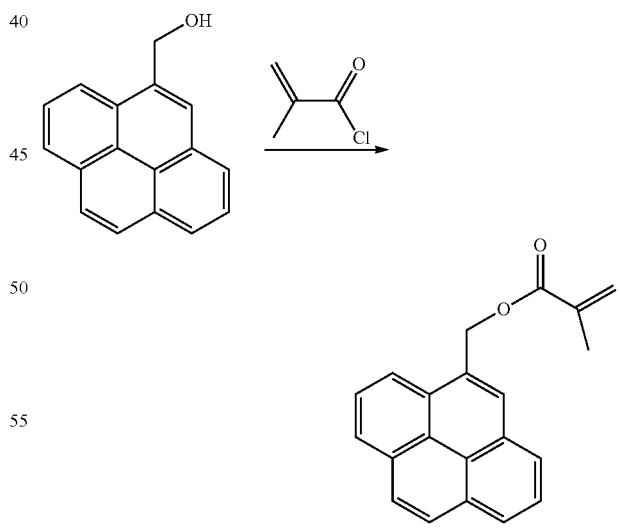

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

EXAMPLE 1

Aqueous Emulsion of Conductive Polymer Binders for Si Anode Materials in Lithium Ion Batteries To combine the advantages of conductive polymer binders and aqueous battery electrode coating processes, a versatile emulsion polymerization method is developed to prepare conductive polymer binder emulsions in water for lithium ion battery applications. These polymer emulsions are used as-is as the binder for silicon containing anode materials. In the resulting electrodes, the binder particles and the active material particles are adhered through "point contact". Increasing the content of aromatic units in the polymer binders can improve the battery performance. After optimization of the material composition in the electrodes, the batteries can achieve about 880 mAh·g$^{-1}$ initial capacity for graphite/silicon composite materials at a ratio of 73/15 with about 75% capacity retention after 200 cycles.

In this work, aqueous process of conductive polymer binders has been realized for silicon containing anode materials. Emulsion polymerization methods have been developed to prepare a series of conductive polymer emulsions in water. The final binder emulsions can be used as is for slurry mixing and electrode coating without further treatment. It combines the advantages of both conductive polymer binders and aqueous process, saving energy and time while making the electrode fabrication process low-cost and environmentally friendly for silicon containing materials. Both homopolymer and copolymer emulsions in water have been synthesized and successfully been used as the binder for silicon containing anodes materials. These polymers bear different aromatic units in the polymer structure, which has shown to affect the resulting battery performance. The electrodes using these polymer emulsions as the binder show promising performance for both pure silicon and silicon/graphite composite materials. Use the polymer emulsions together with CMC as the binders, the resulting electrodes can achieve an initial capacity of about 880 mAh·g$^{-1}$ (based on the mass of active materials) and 75% capacity retention after 200 cycles for the electrode containing 17% silicon and 83% graphite after optimization.

Experiments

Materials. The nano silicon (50-70 nm) was purchased from Nanostructured & amorphous materials, inc. Conductive carbon black C45 was purchased from Timcal. MagE graphite was purchased from Hitachi. Carboxymethyl cellulose sodium salt (CMC, Mw=250 kg/mol, Degree of Substitution=0.9), Triton X-100, sodium dodecyl sulfate (SDS), potassium persulfate ($K_2S_2O_8$), benzyl methacrylate, butyl methacrylate were purchased from Sigma-Aldrich. 1-naphthalenemethyl methacrylate and 1-anthracenemethyl methacrylate were synthesized according to literature methods [17] with relative starting materials.

Preparation of PBzM (P1) and PNaM (P2) emulsion. Before the reaction, a 4% wt. CMC in water solution and a solution of $K_2S_2O_8$ (11 mg, 0.04 mmol) in 4 mL water were prepared in advance. To a round bottom flask, 0.5 g benzyl methacrylate, 1.6 g 4% CMC solution, 0.15 g Triton X-100 and 3.6 g $H_2O$ were added. The mixture was stirred magnetically at 1000 rpm for 15 min until it formed a stable milky emulsion. Under nitrogen atmosphere, the mixture was heated to 70° C. and 1 mL $K_2S_2O_8$ solution was added. The mixture was kept stirring for 30 min, then additional 2.7 g benzyl methacrylate and the rest $K_2S_2O_8$ solution were added dropwise simultaneously over a period of 30 min. After that, the stirring rate was reduced to 600 rpm and the mixture was heated to 80° C. for 1 h and 90° C. for 1.5 h before cooling down. PNaM (P2) emulsion was prepared according to similar procedures of PBzM with relative starting materials.

Preparation of P(AnM$_x$-co-BuM$_y$) emulsions. For the P(AnM$_x$-co-BuM$_y$) emulsion with x/y=5/5. Before the reaction, 0.54 g 1-anthrathenemethyl methacrylate was dissolved in 0.28 g butyl methacrylate to form the solution A. 32.3 mg SDS, 1.5 g 4% CMC and 0.17 g Triton X-100 were dissolved in 2.5 g $H_2O$ to form solution B. 8.7 mg $K_2S_2O_8$ was dissolved in 2.5 mL water as the solution C. Solution B was added to solution A and the mixture was stirred at 1000 rpm for 15 min and then sonicated for 15 min. Under nitrogen atmosphere, the mixture was heated to 70° C. 1 mL solution C was added to the mixture, which was kept stirring for 30 min before adding the rest solution C. Set the stirring rate to 700 rpm, and the mixture was heated to 80° C. for 30 min, then 90° C. for 3 h. P(AnM$_x$-co-BuM$_y$) emulsions with different compositions were prepared using the same procedures with relative starting materials.

Electron mobility. The charge carrier mobility measurement uses Space Charge Limited Current (SCLC) method [20], with a layer-by-layer architecture of ITO/ZnO/ETL/LiQ/Al, where ITO is indium tin oxide, ZnO is zinc oxide, ETL is the electron transporting layer (polymer layer), LiQ is 8-Quinolinolato Lithium and Al is aluminum. The scanning voltage range is from 0 V to 5 V, the resistance of the ITO is 60 Ohm. To calculate the charge carrier mobility, the following equation (Mott-Gurney Law) is used:

$$J = \frac{9}{8}\varepsilon_0\varepsilon_r\mu\frac{V^2}{L^3} \qquad (1)$$

where $\varepsilon_0$ is the vacuum permittivity, $\varepsilon_r$ is the relative permittivity of the polymer (a typical value of 3 is used), $\mu$ is the charge carrier mobility, V is the applied voltage on the polymer layer, and L is the thickness of the polymer layer.

Scanning Electron Microscopy (SEM). SEM images were obtained using a JEOL JSM-7500F field emission scanning electron microscopy with an accelerating voltage of 15 kV at room temperature.

Dynamic Light Scattering (DLS). For the particle size distribution measurement of a polymer binder emulsion, one drop of each freshly synthesized emulsion was added to 2 mL water and then sonicated for 2 min. After that, DLS measurement for particle size distribution was conducted at a Particulate Systems NanoPlus Zeta/nano particle analyzer.

Slurry and electrode casting. Active materials (silicon and/or graphite) and conductive carbon were mixed and milled in an agate mortar for 15 min before adding the 4% CMC solution and milling for another 15 min. After that, the mixture was further added binder emulsions and deionized water and was milled for 15 min. The final slurry was casted onto a copper foil using a doctor blade with 150 μm thickness. The laminates were dried at room temperature for 3 h, compressed to around 40 μm thick using a rolling mill, and further dried at 60° C. under 10$^{-2}$ Torr vacuum for 12 h.

Coin cell fabrication and electrochemical testing. In an Ar-filled glovebox, the electrodes were fabricated into standard 2325 coin cells with lithium film as counter electrodes, and polypropylene separators (Celgard 2400). The electrolyte (BASF) consisting of 70% 1.2 M lithium hexafluoro phosphate (LiPF$_6$) in ethylene carbonate (EC), diethyl carbonate (DEC) (EC/DEC=3/7 by weight), and 30% by weight of fluoroethylene carbonate (FEC) were used. The coin cell performance was evaluated in a thermal chamber at 30° C. with a Maccor Battery Test System at a voltage range of 0.01 V-1 V using C/3 current rate with constant voltage at each lithiation step.

Results and Discussions

Preparation of Emulsions and Characteristics

In order to perform the emulsion polymerization, the monomers are normally liquid or gas. However, while the benzyl methacrylate (BzM) is a thin liquid, the 1-naphthalenemethyl methacrylate (NaM) is more viscous and the 1-anthracenemethyl methacrylate (AnM) is even a solid. Therefore, BzM and NaM were used directly to produce homo-polymer emulsions (FIG. 1; Panel (a): P1 and P2) and AnM was dissolved in butyl methacrylate (BuM) before the reaction to finally produce co-polymer emulsions (FIG. 1; Panel (a): P3~P8). Besides the monomers and water, surfactants with high hydrophile-lipophile balance (HLB) values were used together with CMC as the stabilizer in the reaction mixture to form a stable colloidal system. And potassium persulfate (KPS) was used as the water-borne initiator. Finally, a series of polymer emulsions in water are obtained, as shown in FIG. 1 (Panels (b) and (c)).

Figure 2:
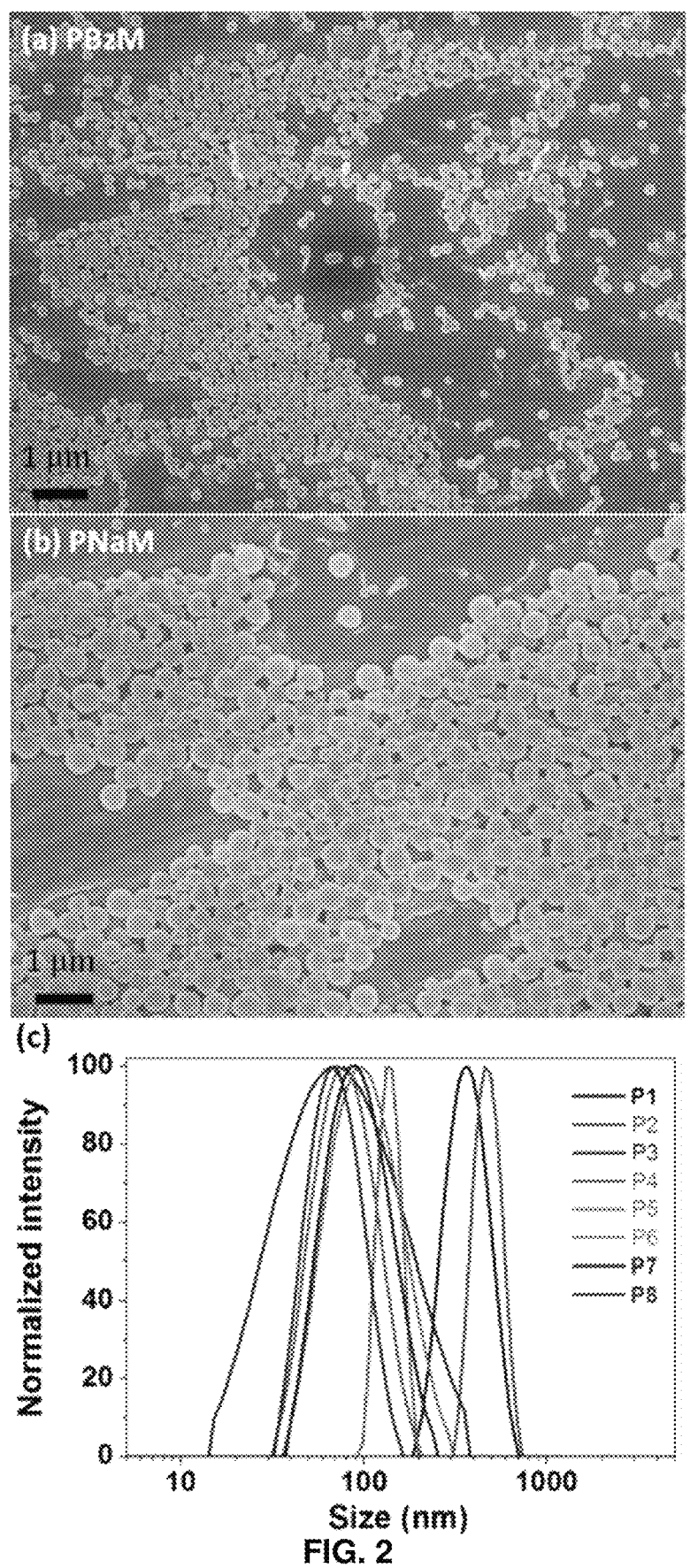
FIG. 2. SEM images of (a) PBzM (P1) particles and (b) PNaM (P2) particles after dry; (c) Normalized DLS size distribution of P1~P8 polymer emulsions.

The resulting polymer emulsions have solid contents around 20%, which can be adjusted by water amount. The final emulsions are quite stable with long shelf life that can be over one year, indicating the reaction conditions are quite robust for emulsion polymerization of these conductive polymers. FIG. 2 (Panel (a)) and FIG. 1 (Panel (b)) shows the SEM images of P1 and P2 emulsion particles after dry, indicating that solid particles are formed in the emulsions after reaction. They are very homogeneous in size at the 100 nm scale. P2 particles are larger than P1 particles, which is in line with the fact that the monomer of P2 is more viscous than that of P1. This result is further confirmed by DLS analysis (FIG. 2; Panel (c)), which shows that the P1 and P2 emulsions have narrow distribution of particle sizes, and that the average size of P1 particles is around 350 nm while that of P2 particles is around 480 nm. P3~P8 exist in the form of oil-in-water emulsions with the average particle size in the range of 73 nm to 139 nm (FIG. 2; Panel (c)).

Charge Carrier Mobility

Figure 3:
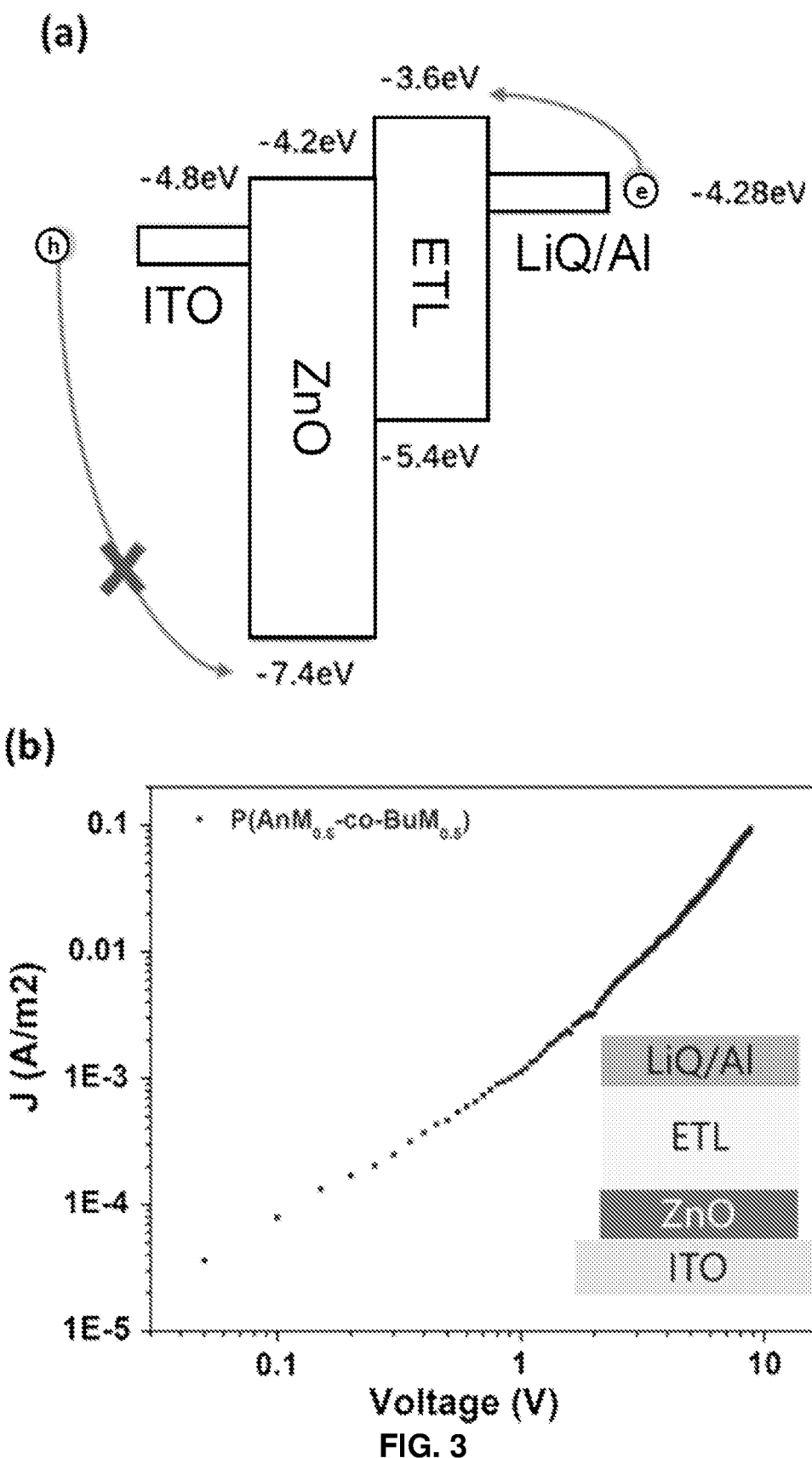
FIG. 3. ITO/ZnO/ETL(polymer)/LiQ/Al device. (a) Energy level diagram of the device ITO/ZnO/ETL(polymer)/LiQ/Al; (b) J-V characteristics of the device with P8 as the ETL polymer layer, with the device structure inserted.
Figure 6:
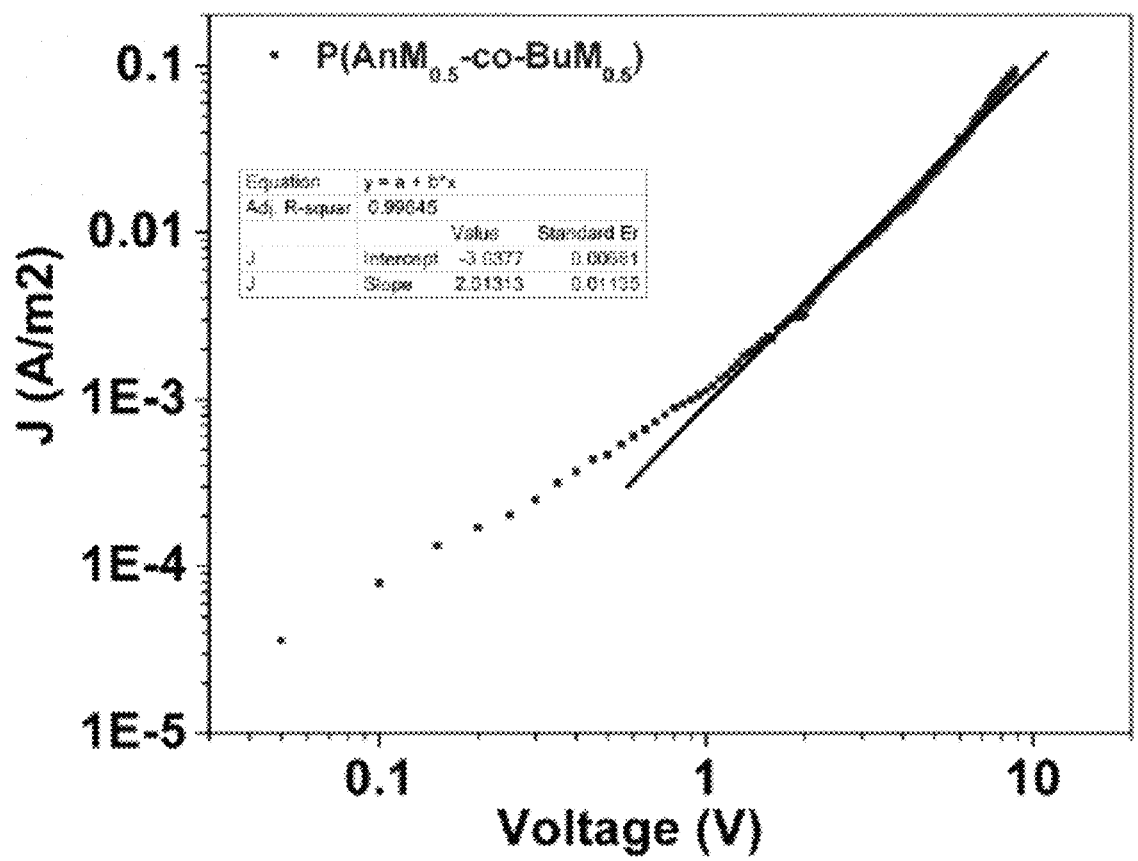
FIG. 6. The J-V characteristic of P(Ant$_{0.5}$-co-BuM$_{0.5}$) (P8) and the fitted curve of the SCLC region.

To estimate the charge transport properties of the synthesized emulsion polymers, we fabricated and analyzed the polymer films in electron transporting diode devices using space charge limited current method. Three polymers, which are P3, P5 and P8 with anthracene unit increased from 0% to 50%, are selected as examples. The device structure is shown in the inserted graph in FIG. 3 (Panel (b)). It is constructed by successively depositing ZnO ((36 nm), polymer (1.2 μm), LiQ (5 nm) and Al (70 nm) onto ITO layer by layer. FIG. 3 (Panel (a)) shows the energy level diagram of each layer in the device. Due to the deep HOMO level of ZnO, the hole transport is blocked and therefore only electron transport is measured. The current density voltage (J-V) characteristics of the device is then measured, where J is the measured current density and the V is the voltage applied on the polymer layer that is corrected by excluding the voltage contribution from the ITO layer. When the applied voltage scans from 0 V to 5 V, the current response changes from the Ohmic region to the SCLC region. We then can fit the experimental data in the SCLC region to the Mott-Gurney law using Eq. (1). While the slope is close to 2, we can use the intercept to calculate the charge carrier mobility. Unfortunately, only P8 is successfully measured and the other polymers failed. FIG. 3 (Panel (b)) shows the J-V characteristics of the P8 polymer, which has 50% anthracene unit in the polymer structure. The fitted curve (FIG. 6) of the SCLC region has a slope of about 2.01 and an intercept of about −3.04, therefore, the electron mobility of P8 is calculated to be $5.7 \times 10^{-7}$ $cm^2 \cdot V^{-1} \cdot s^{-1}$, indicating the moderate semiconducting properties of this polymer.

Cycling Performance

After the successful preparation of the conductive polymer binder emulsions, they were used as is without any further treatment to fabricate battery electrodes with silicon anode materials. Water was the only media used during this whole process for slurry preparation and coating lamination to obtain uniformly coated electrode sheets.

Figure 4:
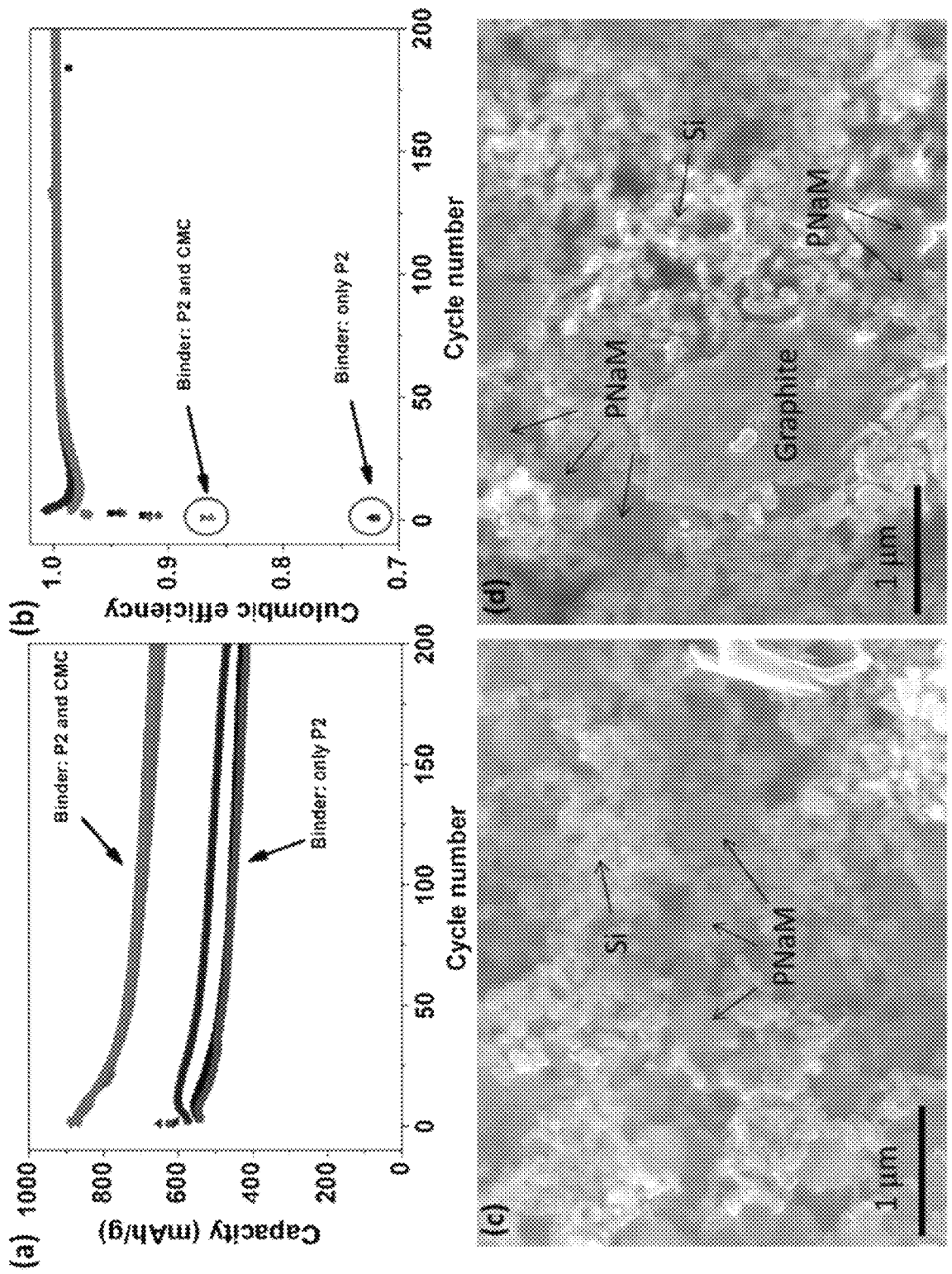
FIG. 4. Cycling performance of battery electrodes with composition 1: magE/Si/C45/PNaM=73/15/2/10 and composition 2: magE/Si/C45/CMC/PNaM=73/15/2/2/8. (a) specific capacity (mAh/g); (b) coulombic efficiency. SEM images of battery electrodes with (c) composition 1, and (d) composition 2.
Figure 7:
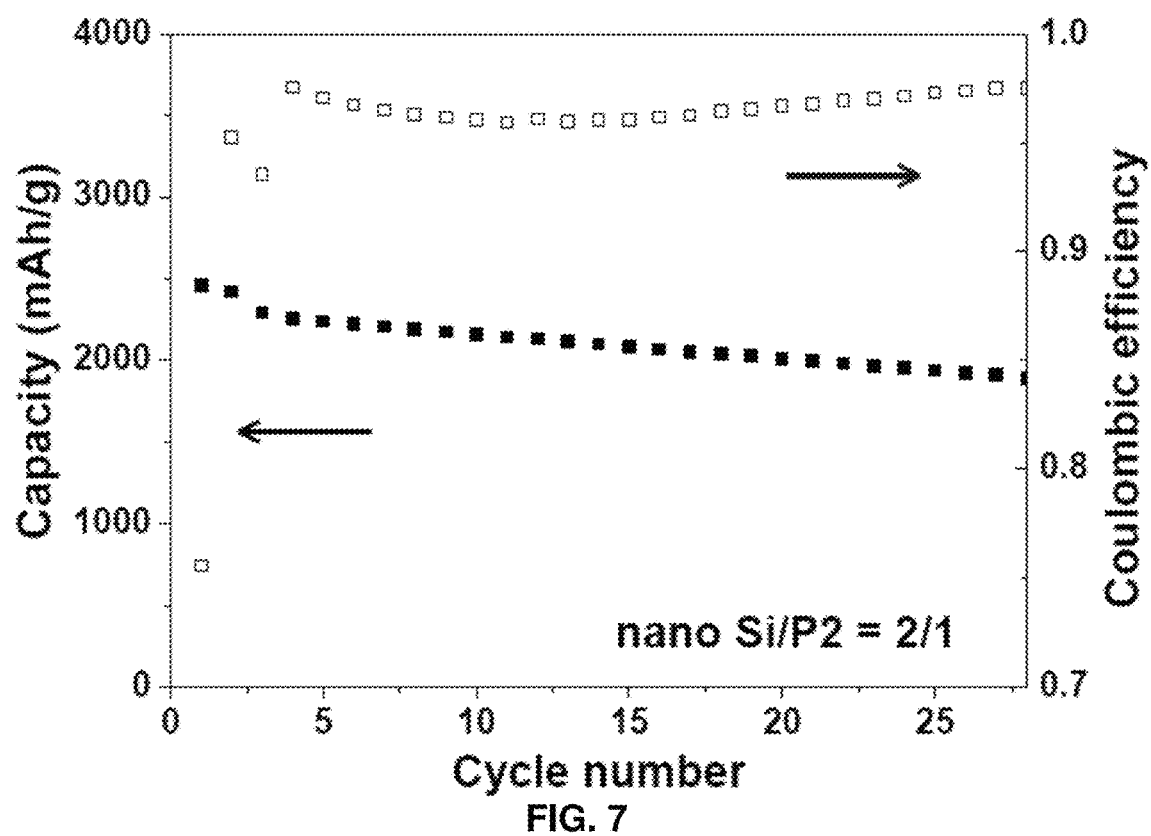
FIG. 7. Cycling performance of battery with composition nano Si/PNaM emulsion=2/1.

Initial test was performed on nano silicon particles and the homo-polymer emulsions and P2 was selected as an example. After fabricating the electrodes at a material ratio of Si/polymer=2/1, coin cells were assembled and cycled at C/3 (1C=4.2 A $g^{-1}$) current rate with potentiostatic step during each lithiation stage. It shows that the battery, consisting of only active material and binder, operates fairly stable with high coulombic efficiency for about 30 cycles, when 75% capacity is retained (FIG. 7). The results indicate that the polymer emulsions are effective binders for silicon materials in battery operation. Further study on different electrode composition was conducted. It is found that the polymer emulsions can also serve as the binders for composite anodes containing graphite and silicon. The solid materials, including magE graphite and nano silicon particles as the active materials and C45 as the conductive additive, were mixed together before adding binder emulsions and water to prepare homogeneous slurries for electrode coating at determined material ratio (magE/Si/C45/binder=73/15/2/10). The resulting electrode laminates show very even material distribution and the battery performance is consistent at C/3 (1C=1 A·$g^{-1}$) current rate with potentiostatic step during each lithiation stage, as shown in the FIG. 4 (Panels (a) and (b)). The capacity decays from about 630 mAh·$g^{-1}$ to about 435 mAh·$g^{-1}$ in 200 cycles, corresponding to 69% capacity retention, with the first cycle coulombic efficiency at 72%. The results are promising while there are room for improvement, since the theoretical capacity for the active materials (83% graphite and 17% silicon) is about 1000 mAh·$g^{-1}$. When maintaining the total amount of binder, combining the usage of P2 emulsion and CMC improves the battery performance largely. Though the detail of this mechanism is still under investigation, it could be owing to the good adhesion and ion conductivity provided by CMC binder [21], [22]. At a ratio of CMC/P2=2/8, the initial capacity of the resulting batteries is improved to about 880 mAh·$g^{-1}$, much closer to the theoretical value, with first cycle coulombic efficiency at about 88%. The cycling stability is also improved. After 200 cycles, about 75% of the initial capacity is retained. The morphology of the electrodes was investigated by SEM. FIG. 4 (Panels (c) and (d)) show the morphology of the electrode with only PNaM emulsion and PNaM/CMC mixture as the binder, respectively. Both distinct silicon particles and PNaM polymer particles are found, indicating that the binder particles can adhere the active materials particles through a "point contact" structure. This structure is potentially beneficial for the lithium access to the active materials since they are not covered by polymer binders, as in the solution processed electrode fabrication, and are directly exposed to electrolytes. When using a mixture of PNaM and CMC as the binder, the materials are more evenly distributed and the particles are closer connected, which could be the reason of the better cycling performance of the resulting electrodes. In the literature, some studies have shown that CMC could possibly play a role as surface modifier to improve the formation of solid electrolyte interface [22], [23], [24]. More study is still on going to improve the capacity and cycling stability further.

Figure 5:
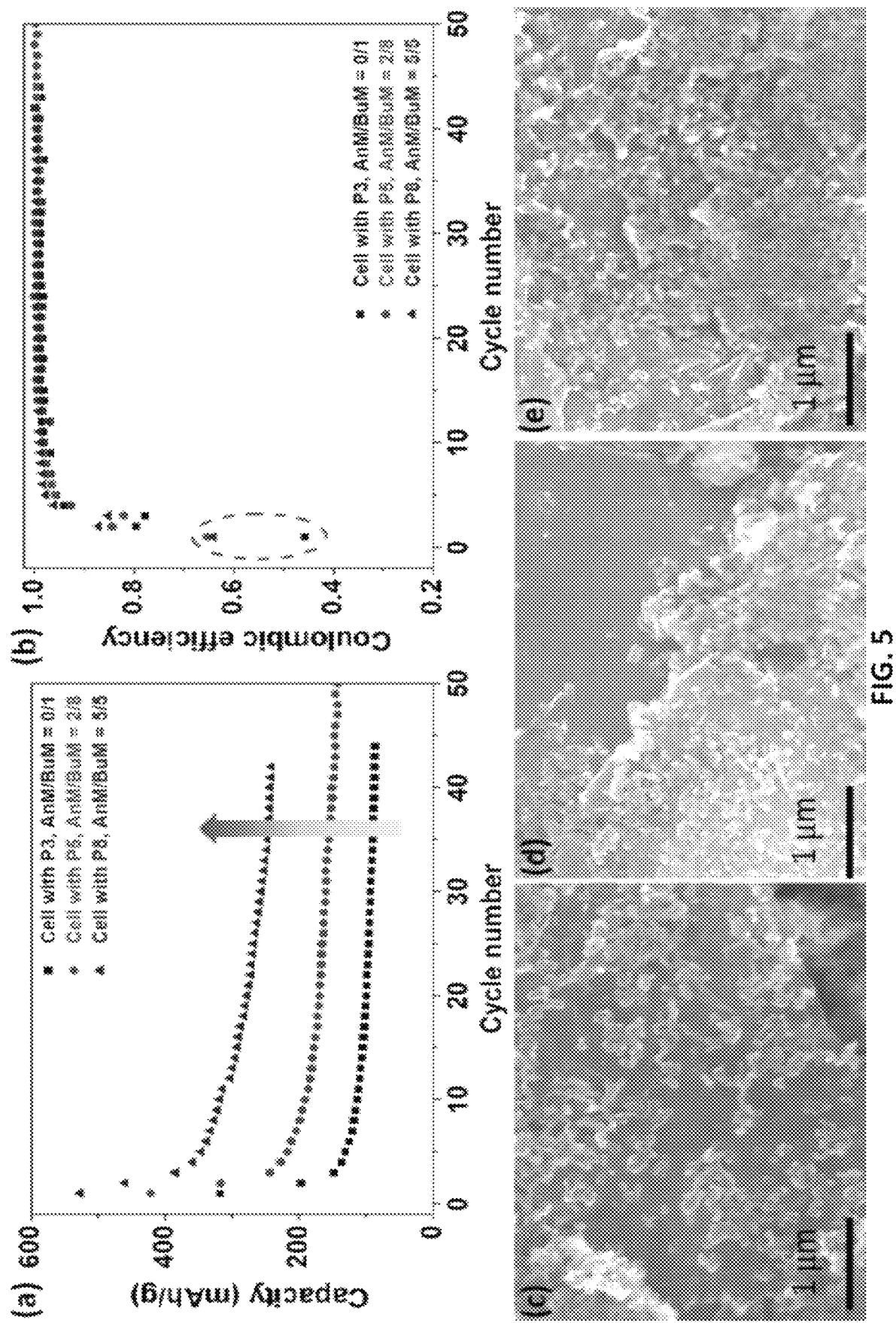
FIG. 5. Cycling performance of battery electrodes at the composition of mage/Si/C45/P(AnMx-co-BuMy)=73/15/2/10 using polymer binder emulsions with different x/y ratio. (a) specific capacity (mAh/g); (b) coulombic efficiency. SEM images of the corresponding battery electrodes using polymers with x/y ratio being (c) x/y=0/1, (d) x/y=2/8, (e) x/y=5/5.
Figure 8:
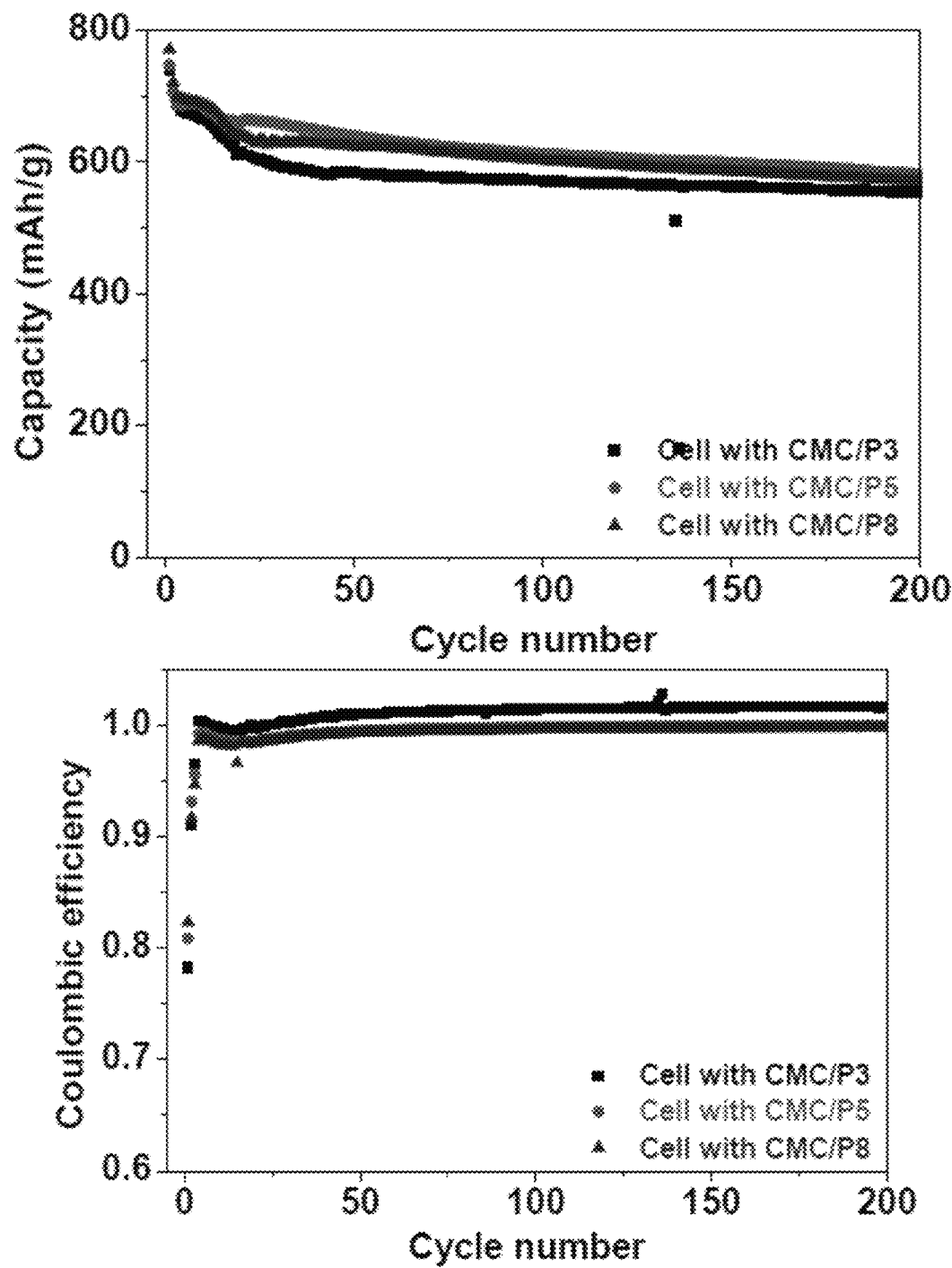
FIG. 8. Cycling performance of battery with composition mage/Si/C45/CMC/emulsion=73/15/2/2/8, left: specific capacity (mAh/g); right: coulombic efficiency.
Figure 9:
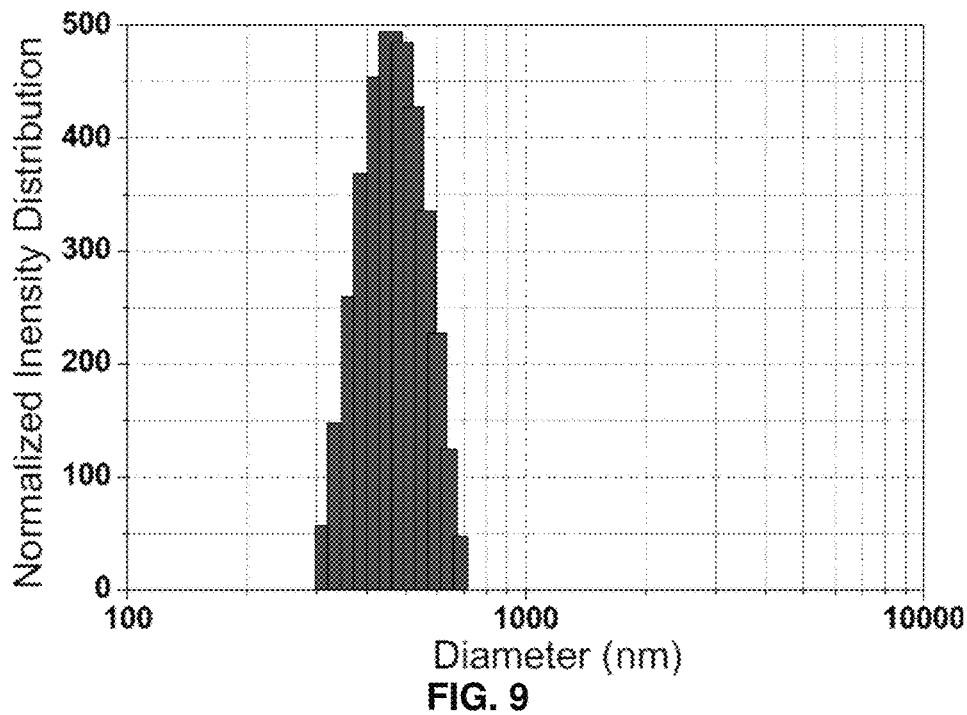
FIG. 9. PNaM size distribution.
Figure 10:
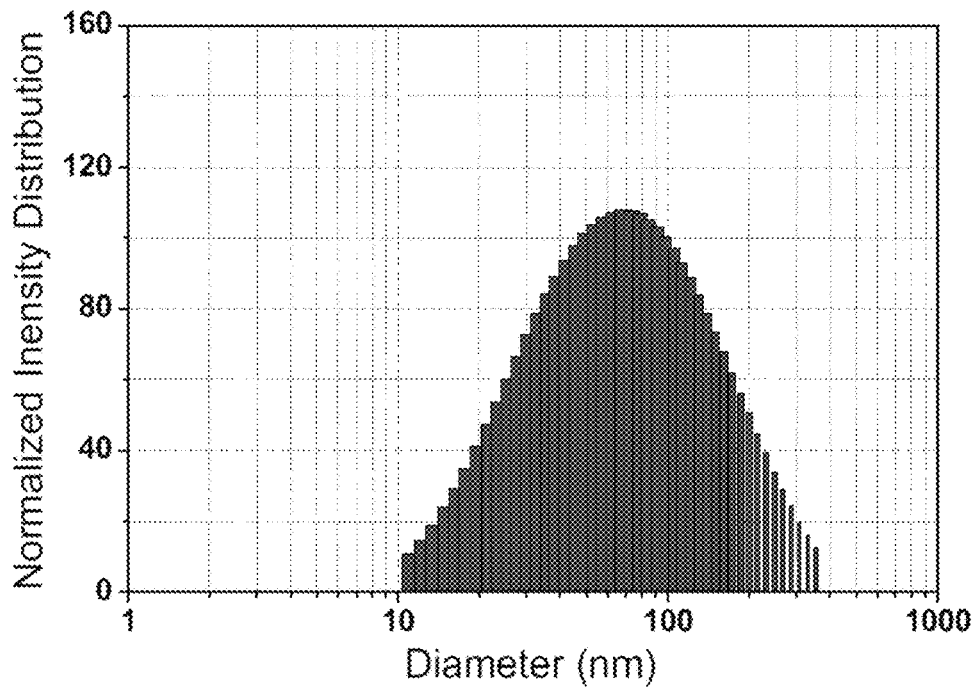
FIG. 10. Polybutylmethacrylate (PBuM) emulsion.
Figure 11:
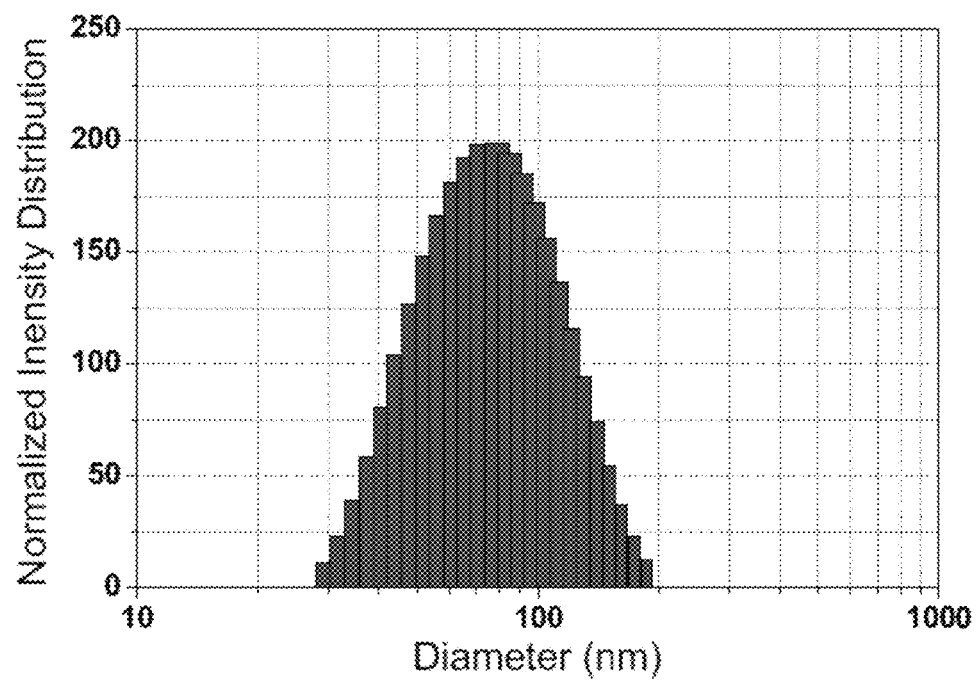
FIG. 11. Polyanthracenemethacrylate (10% by molar ratio)-co-butylmethacrylate (90%) PAnM(10)BuM(90).
Figure 12:
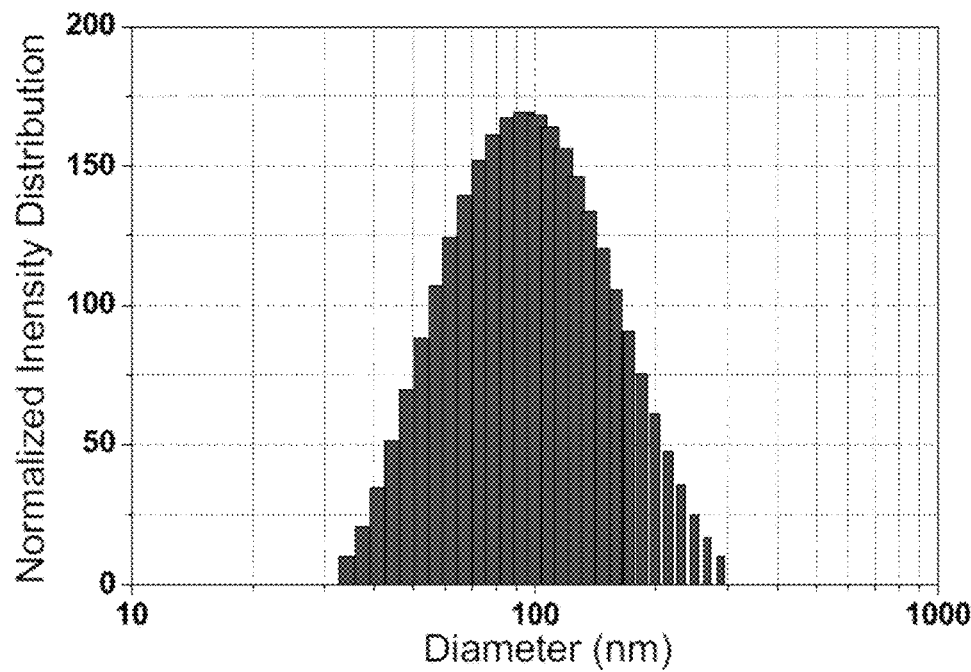
FIG. 12. Polyanthracenemethacrylate (30% by molar ratio)-co-butylmethacrylate (70%) PAnM(30)BuM(70).

The co-polymer emulsions intrinsically have increasing percentage of anthracene unit from P3 to P8. They were also used as the binder for graphite and silicon materials at a ratio of magE/Si/C45/binder=73/15/2/10. It is found that the content of aromatic unit in the binder affects the battery performance. P3, P5 and P8 were chosen as examples, corresponding to the different monomer ratio of AnM/BuM at 0/1, 2/8 and 5/5, respectively. FIG. 5 shows the cycling performance of the resulting batteries and the morphology of relative electrodes. After the capacity drop in the first few cycles, the cells stabilize at different capacity and continue to operate for long-term cycling (FIG. 5; Panels (a) and (b)). A general trend is observed that the specific capacity of the battery increases as the content of AnM in the binder increases from about 100 mAh·g$^{-1}$ for P3 with 0% anthracene unit to about 350 mAh·g$^{-1}$ for P8 with 50% anthracene unit, while the first cycle coulombic efficiency improves from 45% to 64%. It is probably due to that the increased percentage of anthracene unit improves the conductivity of the binder, providing better electronic connection for the active materials in the electrode matrix. This result is consistent with the previous electron mobility experiments that only P8 is successfully measured while P3 and P5 fail. From the morphology, it is observed that the polymer covers all the silicon and carbon materials particles by forming an interconnected network (FIG. 5; Panels (c) to (e)). Similar to that of P2 emulsion, the battery performance is also improved after applying CMC binder. The battery capacity starts from about 750 mAh·g$^{-1}$, stabilizes at about 600 mAh·g$^{-1}$ after a few cycles, and is still over 550 mAh·g$^{-1}$ after 200 cycles (FIG. 8).

CONCLUSION

This work shows a novel designing practice of binders for lithium ion batteries. A series of conductive polymer binder emulsions in water has been prepared using emulsion polymerization methods. These polymer emulsions have been further used for lithium ion battery applications. The electrode coating process is water-based without using any organic solvents, which is lower in cost and more environmentally friendly. Using these polymer emulsions as the binder, silicon materials, solely or together with graphite materials, have been fabricated into electrodes showing promising cycling performance. The increasing amount of aromatic unit in the binders improves the cell performance with higher capacity. When the polymer emulsions are combined with CMC as the binder, the cells can achieve about 880 mAh·g$^{-1}$ initial capacity, close to the theoretical value for the active materials consisting of 17% silicon and 83% graphite, with about 75% capacity retention at 200 cycles.

References cited herein:
[1] M. Armand, J.-M. Tarascon, Building better batteries, Nature 451 (2008) 652-657.
[2] J. B. Goodenough, Y. Kim, Challenges for rechargeable Li batteries, Chem. Mater. 22 (3) (2010) 587-603.
[3] M. N. Obrovac. V. L. Chevrier, Alloy negative electrodes for Li-ion batteries, hem. Rev. 114 (23) (2014) 11444-11502.
[4] George E. Blomgren, The development and future of lithium ion batteries, J. Electrochem. Soc 164 (1) (2017) A5019-A5025.
[5] T. Ohzuku, Y. Iwakoshi, K. Sawai, Formation of lithium-graphite intercalation compounds in nonaqueous electrolytes and their application as a negative electrode for a Lithium Ion (Shuttlecock) cell, J. Electrochem, Soc. 140 (9) (1993) 2490-2498.
[6] J. Graetz, C. C. Ahn, R. Yazami, B. Fultz, Highly reversible lithium storage in nanostructured silicon, Electrochem. Solid-State Lett. 6 (9) (2003) A194-A197.
[7] John Christensen, John Newman, Stress generation and fracture in lithium insertion materials, J. Solid State Electrochem. 10 (5) (2006) 293-319.
[8] J. Li, J. R. Dahn, An in situ X-ray diffraction study of the reaction of Li with crystalline Si, J. Electrochem. Soc. 154 (3) (2007) A156-A161.
[9] G. Lit, S. Xun, N. Vukmirovic, X. Song, P. Olalde-Velasco, H. Zheng. V. S. Battaglia, L. Wang, W. Yang. Polymers with tailored electronic structure for high capacity lithium battery electrodes, Adv. Mater. 23 (40) (2011) 4679-4683.
[10] Igor Kovalenko, Bogdan Zdyrko, Alexandre Magasinski, Benjamin Hertzberg, Zoran Milicev, Ruslan Burtovyy, Igor Luzinov, Gleb Yushin, A major constituent of brown algae for use in high-capacity Li-Ion batteries, Science 334 (2011) 75-79.
[11] Sunghun Choi, Tae-woo Kwon, Ali Coskun, Jang Wook Choi, Highly elastic binders integrating polyrotaxanes for silicon microparticle anodes in lithium ion batteries. Science 357 (2017) 279-283.
[12] N. S. Hochgatterer, M. R. Schweiger, S. Koller, P. R. Raimann, T. Wöhrle, C. Wurm, M. Winter, Silicon/graphite composite electrodes for high-capacity anodes: influence of binder chemistry on cycling stability, Electrochem. Solid-State Lett. 11 (5) (2008) A76-A80.
[13] Jui-Pin Yen, Chia-Chin Chang, Yu-Run Lin, Sen-Thann Shen, Jin-Long Hong, Effects of Styrene-Butadiene Rubber/Carboxymethyl cellulose (SBR/CMC) and Polyvinylidene Difluoride (PVDF) binders on low temperature lithium ion batteries, J. Electrochem. Soc. 160 (10) (2013) A1811-A1818.
[14] Christoph Erk, Torsten Brezesinski, Heino Sommer, Reinhard Shneider, Jürgen Janek, Toward silicon anodes for next-generation lithium ion batteries: a comparative performance study of various polymer binders and silicon nano-powders, Appl. Mater. Interfaces 5 (15) (2013) 7299-7307.
[15] Liangming Wei, Changxin Chen, Zhongyu Hou. Hao Wei, Poly (acrylic acid sodium) grafted carboxymethyl cellulose as a high performance polymer binder for silicon anode in lithium ion batteries, Sci. Rep. 6 (2016) 19583.
[16] M. Wu, X. Xiao, N. Vukmirovic. S. Xun, P. K. Das, X. Song, P. Olalde-Velasco, D. Wang, A. Z. Weber, L. W. Wang, V. S. Battaglia, W. Yang, G. Liu, Toward an ideal polymer binder design for high-capacity battery anodes, J. Am. Chem. Soc. 135 (32) (2013) 1.2048-12056.
[17] S. J. Park, H. Zhao, G. Ai, C. Wang, X. Song, N. Yuca, V. S. Battaglia, W. Yang, G, Liu, Side-chain conducting and phase-separated polymeric binders for high-performance silicon anodes in lithium-ion batteries, J. Am. Chem. Soc. 137 (7) (2015) 2565-2571.

[18] H. Zhao, N. Yuca, Z. Zheng, Y. Fu, V. S. Battaglia, G. Abdelbast, K. Zaghib, G. Liu, High capacity and high density functional conductive polymer and SiO anode for high-energy lithium-ion batteries, ACS Appl Mater. Interfaces 7 (1) (2015) 862-866.

[19] T. Zheng, Z. Jia, N. Lin, T. Langer, S. Lux, I. Lund, A.-C. Gentschev, J. Qiao, G. Liu, Molecular spring enabled high-performance anode for lithium ion batteries, Polymers 9 (2017) 657.

[20] N. F, Mott, R. W. Gurney, Electronics Processes in Ionic Crystals, first ed., Oxford University Press, 1940.

[21] J.-H. Lee, U. Paik, V. A. Hackney, Y.-M. Choi, Effect of carboxymethyl cellulose on aqueous processing of natural graphite negative electrodes and their electrochemical performance for lithium batteries, J. Electrochem. Soc. 152 (9) (2005) A1763-A1769.

[22] J. Li, R. B. Lewis, J. R. Dahn, Sodium carboxymethyl cellulose a potential binder for si negative electrodes for Li-ion batteries, Electrocher. Solid-State. Lett. 10 (2) (2007) A17-A20.

[23] G. Nagasubramanian, D. Doughty, Improving the interfacial resistance in lithium cells with additives, J. Power Sources 96 (1) (2001) 29-32.

[24] M. Holzapfel, M. Buga, W. Scheifele, P. Novik, F.-M. Petrat, A new type of nano-sized silicon/carbon composite electrode for reversible lithium insertion, Chem. Commun. 12 (2005) 1566 . . . 1568.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

All cited references are hereby each specifically incorporated by reference in their entireties.

What is claimed is:

1. An emulsion comprising solid particles of a polymer, or a mixture thereof, comprising one monomer of

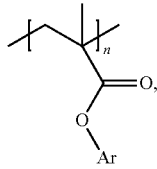

or a mixture thereof, co-polymerized with a monomer of

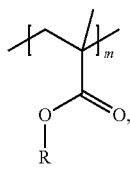

or a mixture thereof; wherein Ar is an aryl group and R is any $C_2$-$C_{10}$ alkyl group, and n:m has a ratio of from 0:100 to 100:0; wherein the polymer comprises at least one monomer of

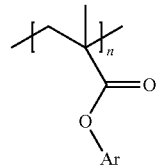

co-polymerized with at least one monomer of

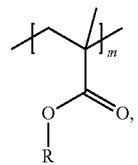

and Ar is a polycyclic aryl group.

2. The emulsion of claim 1, wherein the emulsion is aqueous.

3. The emulsion of claim 1, wherein Ar is any polycyclic aryl group with two, three or four aryl rings.

4. The emulsion of claim 3, wherein Ar is

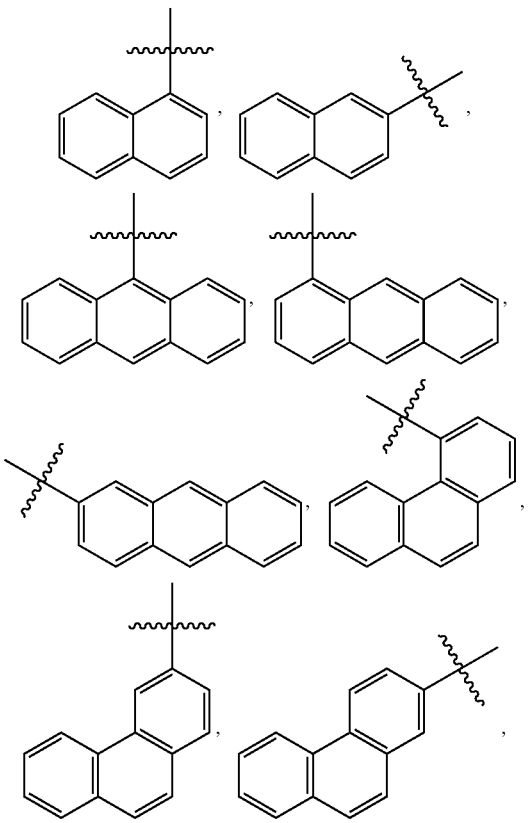

-continued

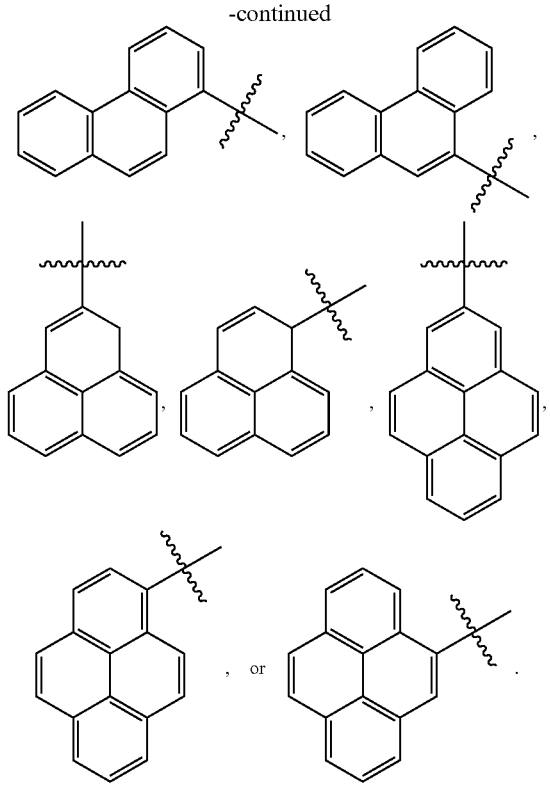

5. The emulsion of claim 1, wherein R is any $C_2$-$C_5$ alkyl group.

6. The emulsion of claim 5, wherein R is an ethyl, propyl, isopropyl, butyl, s-butyl, isobutyl, or t-butyl group.

7. The emulsion of claim 1, wherein the solid particles having an average particle size of about 10 nm to about 500 nm.

8. The emulsion of claim 7, wherein the solid particles having an average particle size of about 50 nm to about 200 nm.

9. The emulsion of claim 7, wherein the solid particles having an average particle size of about 80 nm to about 500 nm.

10. The emulsion of claim 1, wherein n:m has a ratio of from 0:100 to about 1:1.

11. The emulsion of claim 1, wherein the solid particles form at least about 10 weight percent.

12. The emulsion of claim 11, wherein the solid particles form at least about 20 weight percent.

13. The emulsion of claim 1, wherein the Ar

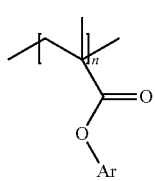

monomer is polymerized from naphthalene methacrylate, anthracene methacrylate, pyrene methacrylate, 1-naphthalenemethyl methacrylate, 9-anthracenemethyl methacrylate, or 1-pyrenemethyl methacrylate.

14. A method for making an electrode for use in a lithium ion battery comprising the steps of:
   a) forming an emulsion comprising solid particles of a polymer, or a mixture thereof, comprising one monomer of

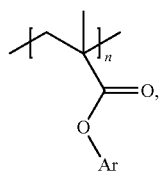

or a mixture thereof, co-polymerized with a monomer of

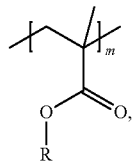

or a mixture thereof; wherein Ar is an aryl group and R is any $C_2$-$C_{10}$ alkyl group, and n:m has a ratio of from 0:100 to 100:0; wherein the polymer comprises at least one monomer of

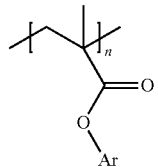

co-polymerized with at least one monomer of

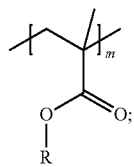

b) to this solution adding micro or nanoparticles of at least one element selected from the group consisting of: silicon, Sn, and graphite to form a slurry;
   c) mixing the slurry to form a homogenous mixture;
   d) depositing a thin film of said thus obtained mixture over top of a substrate; and
   e) drying the resulting composite to form said silicon electrode.

15. A lithium ion battery having a silicon electrode incorporating solid particles of a polymer, or a mixture thereof, comprising one monomer of

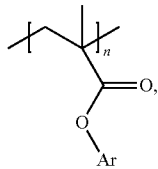
or a mixture thereof, co-polymerized with a monomer of
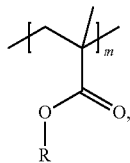
or a mixture thereof; wherein Ar is an aryl group and R is any $C_2$-$C_{10}$ alkyl group, and n:m has a ratio of from 0:100 to 100:0; wherein the polymer comprises at least one monomer of
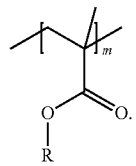
co-polymerized with at least one monomer of
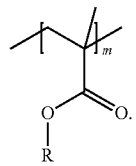
* * * * *